(12) United States Patent
Woo

(10) Patent No.: US 10,928,690 B2
(45) Date of Patent: Feb. 23, 2021

(54) LIQUID CRYSTAL DISPLAY DEVICE

(71) Applicant: Samsung Display Co., Ltd., Yongin-Si (KR)

(72) Inventor: Hwa Sung Woo, Asan-si (KR)

(73) Assignee: Samsung Display Co., Ltd.

( * ) Notice: Subject to any disclaimer, the term of this patent is extended or adjusted under 35 U.S.C. 154(b) by 0 days.

(21) Appl. No.: 16/687,516

(22) Filed: Nov. 18, 2019

(65) Prior Publication Data

US 2020/0081306 A1    Mar. 12, 2020

Related U.S. Application Data

(63) Continuation of application No. 15/676,714, filed on Aug. 14, 2017, now Pat. No. 10,481,450.

(30) Foreign Application Priority Data

Sep. 30, 2016  (KR) .......................... 10-2016-0126651

(51) Int. Cl.
| | | |
|---|---|---|
| *G02F 1/1362* | (2006.01) | |
| *G02F 1/1337* | (2006.01) | |
| *G02F 1/1343* | (2006.01) | |
| *G02F 1/1368* | (2006.01) | |

(52) U.S. Cl.
CPC ...... *G02F 1/136227* (2013.01); *G02F 1/1368* (2013.01); *G02F 1/133707* (2013.01); *G02F 1/134309* (2013.01); *G02F 1/136286* (2013.01); *G02F 2001/134345* (2013.01); *G02F 2201/123* (2013.01)

(58) Field of Classification Search
CPC ......... G02F 1/136227; G02F 1/133707; G02F 1/134309; G02F 2001/134345; G02F 2201/123; G02F 1/136286; G02F 1/1368
See application file for complete search history.

(56) References Cited

U.S. PATENT DOCUMENTS

| | | | | |
|---|---|---|---|---|
| 2011/0242468 A1* | 10/2011 | Choi | ................. | G02F 1/134309 349/129 |
| 2015/0015822 A1 | 1/2015 | Park et al. | | |
| 2015/0116645 A1* | 4/2015 | Han | ................. | G02F 1/134309 349/138 |
| 2015/0168794 A1* | 6/2015 | Park | ................. | G02F 1/133707 349/48 |
| 2016/0342038 A1* | 11/2016 | Shih | ................. | G02F 1/136286 |

FOREIGN PATENT DOCUMENTS

KR      10-2015-0007841 A      1/2015

\* cited by examiner

*Primary Examiner* — Nathanael R Briggs
(74) *Attorney, Agent, or Firm* — Innovation Counsel LLP

(57) ABSTRACT

A liquid crystal display device is provided. The liquid crystal display device comprises a substrate, a thin-film transistor (TFT) disposed on the substrate, an insulating layer disposed on the TFT, and a pixel electrode disposed on the insulating layer and connected to a drain electrode of the TFT via a contact hole formed in the insulating layer. The pixel electrode includes a stem electrode which extends in a first direction and a second direction that is perpendicular to the first direction, branch electrodes which extend from the stem electrode, and an extension electrode which is disposed to overlap the contact hole and which is connected to the branch electrodes. The extension electrode includes a slit.

21 Claims, 20 Drawing Sheets

LIQUID CRYSTAL DISPLAY DEVICE

This application is a continuation application of U.S. patent application Ser. No. 15/676,714 filed Aug. 14, 2017, which claims priority to and the benefit of Korean Patent Application No. 10-2016-0126651, filed on Sep. 30, 2016, in the Korean Intellectual Property Office, the disclosure of which is incorporated herein in its entirety by reference.

BACKGROUND

1. Field

The present disclosure relates generally to liquid crystal display (LCD) devices. More specifically, the present disclosure relates to LCD devices.

2. Description of the Related Art

A liquid crystal display (LCD) device, which is one of the most widely-used display devices, includes two substrates on which field-generating electrodes such as pixel electrodes and a common electrode are formed, and a liquid crystal layer which is inserted between the two substrates. The LCD device generates an electric field in the liquid crystal layer by applying voltages to the field-generating electrodes, and displays an image by determining the orientation of liquid crystal molecules in the liquid crystal layer and controlling the polarization of incident light using the electric field.

Particularly, a vertical alignment (VA)-mode LCD device, which aligns liquid crystal molecules such that the long axes of the liquid crystal molecules are perpendicular to upper and lower substrates in the absence of an electric field, has been developed.

In the VA-mode LCD device, the alignment direction and tilt angle of liquid crystal molecules are determined by patterns formed on pixel electrodes. However, irregular patterns may be formed on the pixel electrodes, especially in regions where the pixel electrodes are physically connected to a voltage source to be provided with a voltage. In regions where contact holes, which connect the pixel electrodes and elements below the pixel electrodes, are formed, not only the irregular patterns of the pixel electrodes, but also height differences caused by the contact holes, may be present.

Due to the irregular patterns of the pixel electrodes and the height differences caused by the contact holes, the liquid crystal molecules may be easily misaligned. In a case in which the liquid crystal molecules are misaligned by external pressure applied to the liquid crystal layer, a restoring force for the liquid crystal molecules may weaken, and as a result, smudges may become visible on the outside of the VA-mode LCD device. That is, controlling and restoring forces for the liquid crystal molecules may both weaken.

Thus, a structure capable of compensating for, and thus improving, controlling and restoring forces for liquid crystal molecules has been the subject of recent efforts.

SUMMARY

Exemplary embodiments of the present disclosure provide a liquid crystal display (LCD) device with improved controlling and restoring forces for liquid crystal molecules.

However, exemplary embodiments of the present disclosure are not restricted to those set forth herein. The above and other exemplary embodiments of the present disclosure will become more apparent to one of ordinary skill in the art to which the present disclosure pertains by referencing the detailed description of the present disclosure given below.

According to an exemplary embodiment of the present disclosure, there is provided a liquid crystal display device. The liquid crystal display device comprises a substrate, a thin-film transistor (TFT) disposed on the substrate, an insulating layer disposed on the TFT, and a pixel electrode disposed on the insulating layer and connected to a drain electrode of the TFT via a contact hole formed in the insulating layer. The pixel electrode includes a stem electrode which extends in a first direction and a second direction that is perpendicular to the first direction, branch electrodes which extend from the stem electrode, and an extension electrode which is disposed to overlap the contact hole and which is connected to the branch electrodes. The extension electrode includes a slit.

According to another exemplary embodiment of the present disclosure, there is provided a liquid crystal display device. The liquid crystal display device comprises a substrate, a gate line, a sustain line, a data line and first through third thin film transistors (TFTs) all of which are disposed on the substrate, and an insulating layer disposed on the data line, the gate line and the first through third TFTs. Also included is a first sub-pixel electrode disposed on the insulating layer, connected to a drain electrode of the first TFT via a first contact hole formed in the insulating layer, and connected to a drain electrode of the third TFT via a first sustain contact hole formed in the insulating layer. Further included is a second sub-pixel electrode disposed on the insulating layer and connected to a drain electrode of the second TFT via a second contact hole formed in the insulating layer. Gate electrodes of the first through third TFTs are connected to the gate line, source electrodes of the first and second TFTs are connected to the data line, and a source electrode of the third TFT is connected to the sustain line. The first sub-pixel electrode includes a first stem electrode which extends in a first direction and a second direction that is perpendicular to the first direction, first branch electrodes which extend from the first stem electrode, and a first extension electrode which is disposed to overlap the first contact hole and is connected to the first branch electrodes. The first extension electrode includes a first slit.

According to another exemplary embodiment of the present disclosure, there is provided a liquid crystal display device. The liquid crystal display device comprises a substrate, a TFT disposed on the substrate, an insulating layer disposed on the TFT, and a pixel electrode disposed on the insulating layer and connected to a drain electrode of the TFT via a contact hole formed in the insulating layer. The pixel electrode includes a stem electrode which extends in a first direction and a second direction that is perpendicular to the first direction, branch electrodes which extend from the stem electrode, an edge electrode which extends from an end of the stem electrode and extends in the first or second direction along an outer boundary of the branch electrodes, an extension electrode which is disposed to overlap the contact hole and which is connected to the branch electrodes, and a connecting electrode which connects the extension electrode and the edge electrode. The connecting electrode extends in a third direction which intersects both the first and second directions.

According to exemplary embodiments of the present disclosure, an LCD device with improved controlling and restoring forces for liquid crystal molecules can be provided.

Other features and exemplary embodiments may be apparent from the following detailed description, the drawings and the claims.

BRIEF DESCRIPTION OF THE DRAWINGS

The above and other exemplary embodiments and features of the present disclosure will become more apparent by describing in detail exemplary embodiments thereof with reference to the attached drawings, in which.

DETAILED DESCRIPTION

Figure 1:
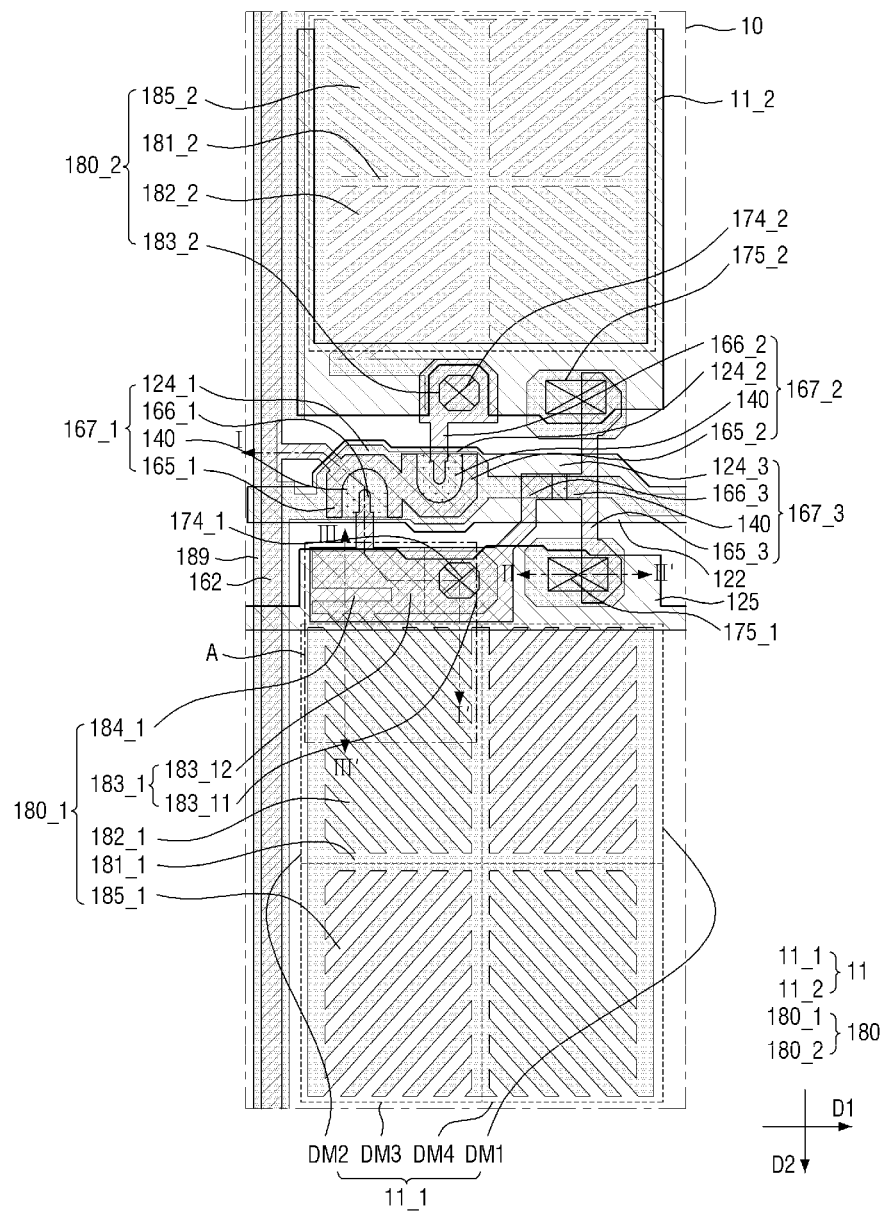
FIG. 1 is a layout view of a pixel of a liquid crystal display (LCD) device according to an exemplary embodiment of the present disclosure.

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. The same reference numbers indicate the same components throughout the specification. In the attached figures, the thickness of layers and regions is exaggerated for clarity. The various figures are thus not to scale.

It will be understood that, although the terms first, second, third, etc., may be used herein to describe various elements, these elements should not be limited by these terms. These terms are only used to distinguish one element from another element. Thus, a first element discussed below could be termed a second element without departing from the teachings of the invention.

The terminology used herein is for describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

In the present invention, an electronic apparatus may be any apparatus provided with a display device. Examples of the electronic apparatus may include smart phones, mobile phones, navigators, game machines, TVs, car head units, notebook computers, laptop computers, tablet computers, personal media players (PMPs), and personal digital assistants (PDAs). The electronic apparatus may be embodied as a pocket-sized portable communication terminal having a wireless communication function. Further, the display device may be a flexible display device capable of changing its shape.

All numerical values are approximate, and may vary. All examples of specific materials and compositions are to be taken as nonlimiting and exemplary only. Other suitable materials and compositions may be used instead.

Hereinafter, embodiments of the present invention will be described with reference to the accompanying drawings.

Figure 2:
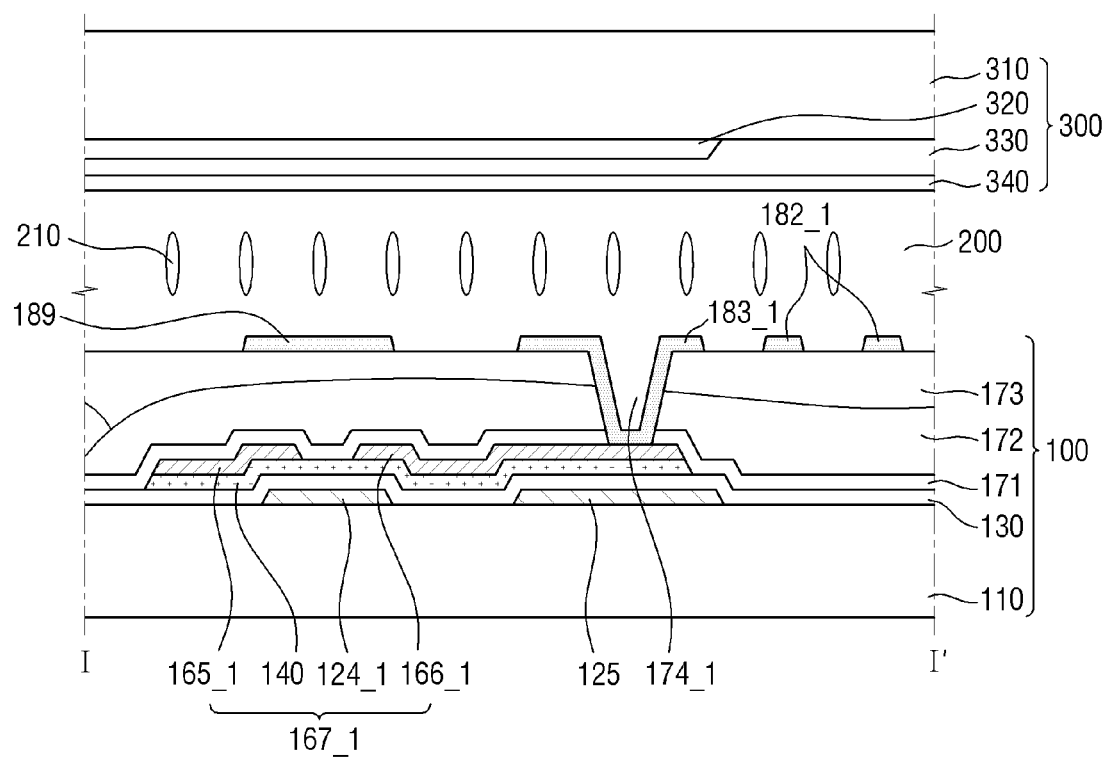
FIG. 2 is a cross-sectional view taken along line I-I' of FIG. 1.
Figure 3:
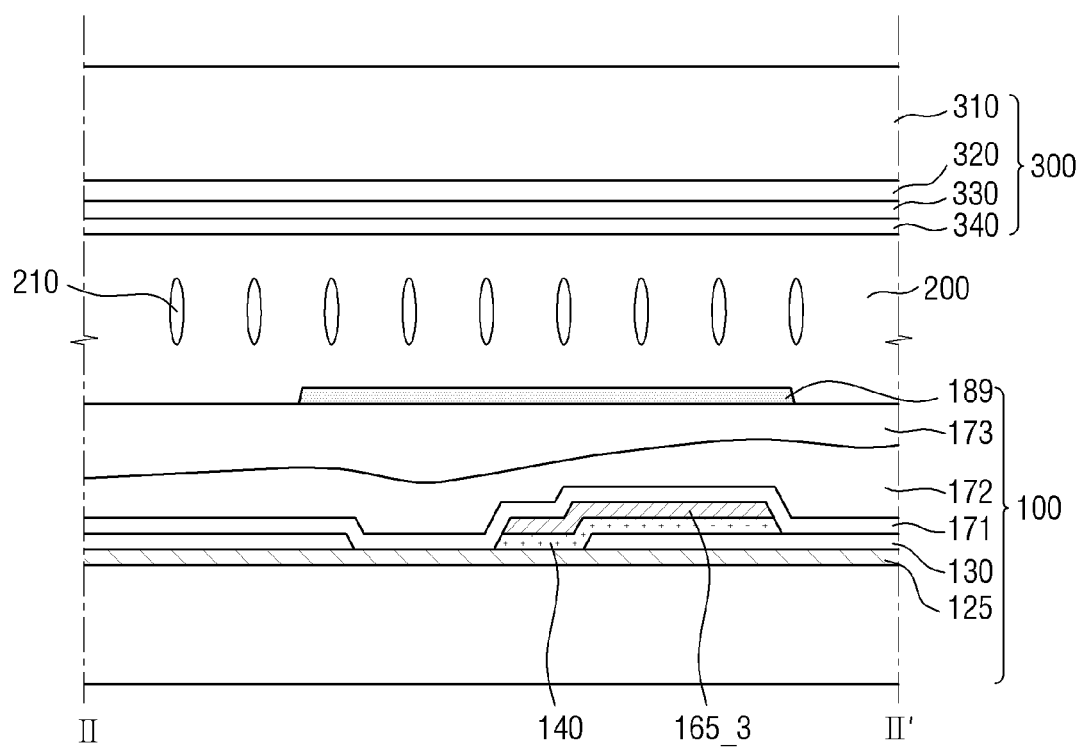
FIG. 3 is a cross-sectional view taken along line II-II' of FIG. 1.
Figure 4:
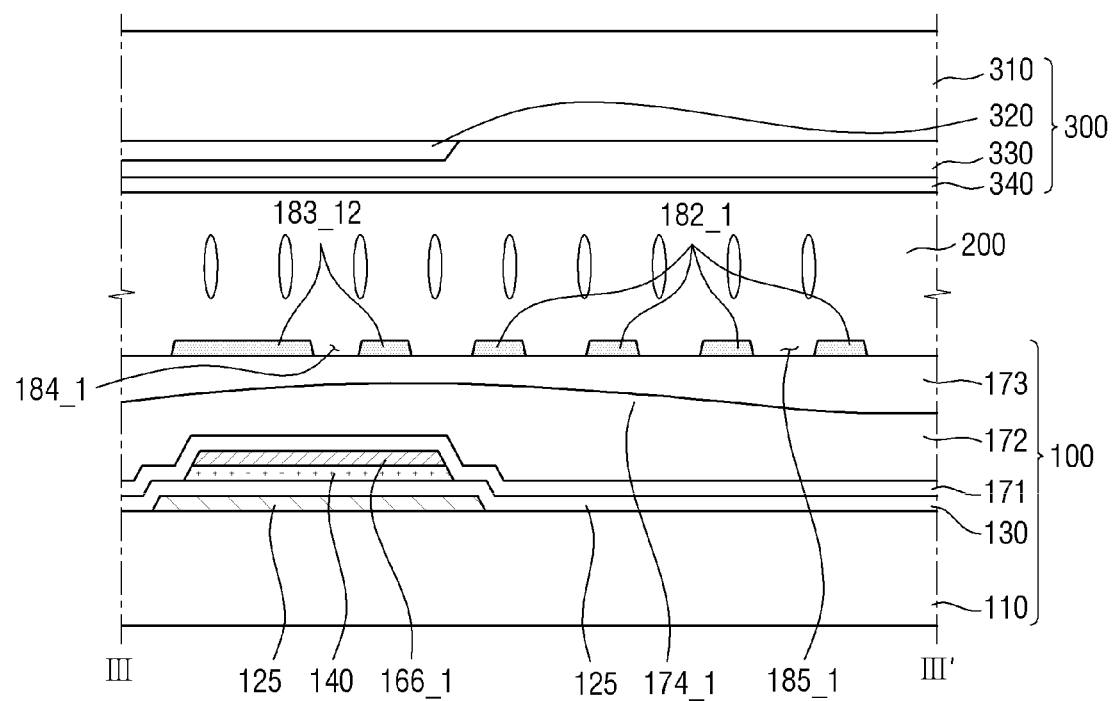
FIG. 4 is a cross-sectional view taken along line III-Ill' of FIG. 1.

FIG. 1 is a layout view of a pixel of a liquid crystal display (LCD) device according to an exemplary embodiment of the present disclosure, FIG. 2 is a cross-sectional view taken along line I-I' of FIG. 1, FIG. 3 is a cross-sectional view taken along line II-II' of FIG. 1, and FIG. 4 is a cross-sectional view taken along line III-III' of FIG. 1.

Referring to FIGS. 1 through 4, the LCD device according to the present exemplary embodiment includes a first display substrate 100, a second display substrate 300 and a liquid crystal layer 200.

Switching devices for driving liquid crystal molecules 210 in the liquid crystal layer 200, for example, first, second and third thin-film transistors (TFTs) 167_1, 167_2 and 167_3, are provided in the first display substrate 100. The second display substrate 300 is a counter substrate disposed to face the first display substrate 100.

The liquid crystal layer 200 may be interposed between the first and second display substrates 100 and 300, and may include liquid crystal molecules 210 which have dielectric anisotropy. In response to an electric field being applied between the first and second display substrates 100 and 300, the liquid crystal molecules 210 may rotate in a particular direction between the first and second display substrates 100 and 300 so as to allow or block the transmission of light through the liquid crystal layer 200. The term "rotation of the liquid crystal molecules 210", as used herein, not only means that the liquid crystal molecules 210 actually rotate, but also means that the alignment of the liquid crystal molecules 210 changes due to an electric field.

The LCD device according to the present exemplary embodiment includes multiple pixels 10 arranged in a matrix. The gray level of each pixel 10 may be independently controllable. The pixel 10 may be a basic unit for displaying a particular color. The pixel 10 includes an active region 11, which transmits light incident thereupon from the bottom of the first display substrate 100 therethrough toward the top of the second display substrate 300 and thus displays a color.

The first display substrate 100 will hereinafter be described.

The first display substrate 100 includes a first base substrate 110. The first base substrate 110 may be a transparent insulating substrate. For example, the first base substrate 110 may be a glass substrate, a quartz substrate, or a transparent resin substrate.

In some exemplary embodiments, the first base substrate 110 may be curved along a particular direction. In some other exemplary embodiments, the first base substrate 110 may have flexibility. That is, the first base substrate 110 may be deformable through rolling, folding, or bending.

A gate line 122, first, second and third gate electrodes 124_1, 124_2 and 124_3, and a sustain line 125 are disposed on the first base substrate 110.

The gate line 122 transmits a gate voltage which controls the first, second and third TFTs 167_1, 167_2 and 167_3. The gate line 122 may extend generally in a first direction D1.

The first direction D1, which is perpendicular to a second direction D2, may be a direction parallel to one side of the first base substrate 110, and may be defined as a direction indicated by an arbitrary straight line extending from the left to the right of FIG. 1. The second direction D2 may be defined as a direction indicated by an arbitrary straight line extending from the top to the bottom of FIG. 1.

The gate voltage may be provided by an external source and may have a variable level. The turning on or off of the first, second and third TFTs 167_1, 167_2 and 167_3 may be controlled by the level of the gate voltage.

The first, second and third gate electrodes 124_1, 124_2 and 124_3 may be formed to protrude from the gate line 122 and may be physically connected to the gate line 122. The first, second and third gate electrodes 124_1, 124_2 and 124_3 may be elements of the first, second and third TFTs 167_1, 167_2 and 167_3, respectively, which will be described later.

In some exemplary embodiments, when the first, second and third gate electrodes 124_1, 124_2 and 124_3 are disposed adjacent to one another, as illustrated in FIG. 1, the first, second and third gate electrodes 124_1, 124_2 and 124_3 may be integrally formed as a single protrusion projected from the gate line 122. The sustain line 125 may be disposed on the first base substrate 110, on the same layer as the gate line 122. The sustain line 125 may substantially extend in the first direction D1 and may also extend along the edges of the active region 11.

The sustain line 125 may transmit a sustain voltage, from an external source, to the third TFT 167_3. The sustain voltage may have a uniform level and may be lower than a maximum level of the data voltage provided to the data line 162, and higher than a minimum level of the data voltage provided to the data line 162.

The sustain line 125 may be disposed adjacent to, or may overlap, the edges of a pixel electrode 180 that will be described later, and a predetermined capacitance may be formed between the pixel electrode 180 and the sustain line 125. Accordingly, a sudden drop in a voltage provided to the pixel electrode 180 may be prevented. The pixel electrode 180 may include first and second sub-pixel electrodes 180_1 and 180_2, and the structure of the pixel electrode 180 will be described later in detail.

The gate line 122, the first, second and third gate electrodes 124_1, 124_2 and 124_3 and the sustain line 125 may be formed of the same material. For example, the gate line 122, the first, second and third gate electrodes 124_1, 124_2 and 124_3 and the sustain line 125 may comprise aluminum (Al), an Al-based metal such as an Al alloy, silver (Ag), a Ag-based metal such as a Ag alloy, copper (Cu), a Cu-based metal such as a Cu alloy, molybdenum (Mo), a Mo-based metal such as a Mo alloy, chromium (Cr), tantalum (Ta), titanium (Ti), or the like. The gate line 122, the first, second and third gate electrodes 124_1, 124_2 and 124_3 and the sustain line 125 may have a single-layer structure or may have a multilayer structure including two conductive films having different physical properties.

A first insulating layer 130 is disposed on the gate line 122, the first, second and third gate electrodes 124_1, 124_2 and 124_3 and the sustain line 125. The first insulating layer 130 may be formed of an insulating material. For example, the first insulating layer 130 may be formed of silicon nitride or silicon oxide. The first insulating layer 130 may have a single-layer structure, or may have a multilayer structure including two insulating films having different physical properties.

A semiconductor layer 140 is disposed on the first insulating layer 130. The semiconductor layer 140 may at least partially overlap each of the first, second and third gate electrodes 124_1, 124_2 and 124_3. The semiconductor layer 140 may be formed of amorphous silicon, polycrystalline silicon, or an oxide semiconductor.

The semiconductor layer 140 may overlap the first, second and third gate electrodes 124_1, 124_2 and 124_3 and may also overlap a data line 162, first, second and third source electrodes 165_1, 165_2 and 165_3 and first, second and third drain electrodes 166_1, 166_2 and 166_3 that will be described later.

Although not specifically illustrated, in some exemplary embodiments, ohmic contact members may be additionally provided on the semiconductor layer 140. The ohmic contact members may be formed of silicide or n+ hydrogenated amorphous silicon doped with a high concentration of n-type impurities. The ohmic contact members may be disposed on the semiconductor layer 140 in pairs. The ohmic contact members, which are disposed for example among the first source electrode 165_1, the first drain electrode 166_1 and the semiconductor layer 140, may enable the source electrode 165, the drain electrode 166 and the semiconductor layer 140 to have ohmic contact properties. In a case in which the semiconductor layer 140 comprises an oxide semiconductor, the ohmic contact members may not be provided. The ohmic contact members may also be provided among the second source electrode 165_2, the first drain electrode 166_2 and the semiconductor layer 140 and among the third source electrode 165_3, the third drain electrode 166_3 and the semiconductor layer 140.

The data line 162, the first, second and third source electrodes 165_1, 165_2 and 165_3 and the first, second and third drain electrodes 166_1, 166_2 and 166_3 are disposed on the semiconductor layer 140 and the first insulating layer 130.

The data line 162 may extend in the second direction D2 and may intersect the gate line 122.

The data line 162 may be insulated from the gate line 122 and the first, second and third gate electrodes 124_1, 124_2 and 124_3 by the first insulating layer 130.

The data line 162 may provide a data voltage to the first, second and third source electrodes 165_1, 165_2 and 165_3. The data voltage may be provided by an external source and may have a variable level. The gray level of the pixel 10 may vary depending on the level of the data voltage.

The first source electrode 165_1 may be branched off from the data line 162 and may at least partially overlap the first gate electrode 124_1. Accordingly, the first source electrode 165_1 may receive the data voltage from the data line 162.

The second source electrode 165_2 may be branched off from the data line 162 and may at least partially overlap the second gate electrode 124_2, but the present disclosure is not limited thereto. That is, alternatively, as illustrated in FIG. 1, the second source electrode 165_2 may be branched off from the first source electrode 165_1 and may receive the data voltage from the first source electrode 165_1.

The third source electrode 165_3 may be physically separated, and electrically insulated, from the data line 162. As illustrated in FIG. 1, the third source electrode 165_3 may be connected to the sustain line 125 via a first sustain contact hole 175_1 which penetrates the first insulating layer 130, and may partially overlap the third gate electrode 124_3. Accordingly, the third source electrode 165_3 may receive the sustain voltage from the sustain line 125.

As illustrated in FIG. 1, the first drain electrode 166_1 may be spaced apart from the first source electrode 165_1 over the semiconductor layer 140 and may partially overlap the first gate electrode 124_1.

As illustrated in FIG. 1, the second drain electrode 166_2 may be spaced apart from the second source electrode 165_2 over the semiconductor layer 140 and may partially overlap the second gate electrode 124_2.

The first and second drain electrodes 166_1 and 166_2 may be surrounded by the first and second source electrodes 165_1 and 165_2, respectively, which are C-shaped, while maintaining a predetermined gap from the first and second source electrodes 165_1 and 165_2, respectively, but the present disclosure is not limited thereto. Alternatively, the first and second drain electrodes 166_1 and 166_2 may extend in parallel to the first and second source electrodes 165_1 and 165_2, respectively, while maintaining a predetermined gap from the first and second source electrodes 165_1 and 165_2, respectively.

As illustrated in FIG. 1, the third drain electrode 166_3 may be spaced apart from the third source electrode 165_3 over the semiconductor layer 140 and may partially overlap the third gate electrode 124_3.

The third drain electrode 166_3 may extend in parallel to the third source electrode 165_3, while maintaining a predetermined gap from the third source electrode 165_3, but the present disclosure is not limited thereto. Alternatively, the third drain electrode 166_3 may be surrounded by the third source electrode 165_3, which is C-shaped, while maintaining a predetermined gap from the third source electrode 165_3.

The first and third drain electrodes 166_1 and 166_3 may be connected to each other and may be connected to the first sub-pixel electrode 180_1 via a first contact hole 174_1 that will be described later. The second drain electrode 166_2 may be connected to the second sub-pixel electrode 180_2 via a second contact hole 174_2 that will be described later.

The data line 162, the first, second and third source electrodes 165_1, 165_2 and 165_3 and the first, second and third drain electrodes 166_1, 166_2 and 166_3 may be formed of the same material. For example, the data line 162, the first, second and third source electrodes 165_1, 165_2 and 165_3 and the first, second and third drain electrodes 166_1, 166_2 and 166_3 may be formed of Al, Cu, Ag, Mo, Cr, Ti, Ta or an alloy thereof. The data line 162, the first, second and third source electrodes 165_1, 165_2 and 165_3 and the first, second and third drain electrodes 166_1, 166_2 and 166_3 may have a multilayer structure including a lower film (not illustrated) formed of a refractory metal and a low-resistance upper film (not illustrated) formed on the lower film, but the present disclosure is not limited thereto.

The first gate electrode 124_1, the semiconductor layer 140, the first source electrode 165_1 and the first drain electrode 166_1 may collectively form the first TFT 167_1, which is a switching device. Similarly, the second gate electrode 124_2, the semiconductor layer 140, the second source electrode 165_2 and the second drain electrode 166_2 may collectively form the second TFT 167_2, which is a switching device. Similarly, the third gate electrode 124_3, the semiconductor layer 140, the third source electrode 165_3 and the third drain electrode 166_3 may collectively form the third TFT 167_3, which is a switching device.

If the gate voltage provided to the first gate electrode 124_1 has a level turning on the first TFT 167_1, the data voltage provided to the data line 162 may be transmitted to the first drain electrode 166_1 via the first source electrode 165_1. If the gate voltage provided to the third gate electrode 124_3 has a level turning on the third TFT 167_3, the sustain voltage provided to the sustain line 125 may be transmitted to the third drain electrode 166_3 via the third source electrode 165_3.

As mentioned above, the first and third drain electrodes 166_1 and 166_3 may be connected to the first sub-pixel electrode 180_1 via the first contact hole 174_1, and the sustain voltage may be lower than the data voltage. Thus, the voltage finally provided to the first sub-pixel electrode 180_1 may be lower than the data voltage.

If the gate voltage provided to the second gate electrode 124_2 has a level turning on the second TFT 167_2, the data voltage provided to the data line 162 may be transmitted to the second drain electrode 166_2 via the second source electrode 165_2. Since the second drain electrode 166_2 is connected to the second sub-pixel electrode 180_2 via the second contact hole 174_2, the data voltage may also be provided to the second sub-pixel electrode 180_2.

Even though the same data voltage is provided throughout the pixel 10, the voltage provided to the first sub-pixel electrode 180_1 may differ from the voltage provided to the second sub-pixel electrode 180_2. As a result, the liquid crystal molecules 210 may be tilted at various angles, and thus, the visibility of the LCD device according to the present exemplary embodiment may be improved.

A passivation layer 171 is disposed on the first insulating layer 130 and the first, second and third TFTs 167_1, 167_2 and 167_3. The passivation layer 171 may be formed of an inorganic insulating material and may be disposed to cover the first, second and third TFTs 167_1, 167_2 and 167_3. The passivation layer 171 may protect the first, second and third TFTs 167_1, 167_2 and 167_3 and may prevent the materials of a color filter layer 172 and a second insulating layer 173 that will be described later from infiltrating into the semiconductor layer 140.

The color filter layer 172 is disposed on the passivation layer 171. The color filter layer 172 may be formed of a photosensitive organic composition comprising a pigment for realizing a color, and the pigment may include any one of, for example, red, green and blue pigments. In some embodiments, the color filter layer 172 may include a plurality of color filters. For instance, each of the plurality of color filters may display any one of a number of primary colors such as red, green and blue, but the present disclosure is not limited thereto. That is, in another example, each of the plurality of color filters may display any one of cyan, magenta, yellow and white colors.

The second insulating layer 173 is disposed on the color filter layer 172. The second insulating layer 173 may be formed of an insulating material. For example, the second insulating layer 173 may be an organic layer formed of an organic material. The second insulating layer 173 may planarize any local height difference that may be generated by elements provided between the second insulating layer 173 and the first base substrate 110. In other words, the top surface of the second insulating layer 173 may be substantially flat.

First and second contact holes 174_1 and 174_2 and first and second sustain contact holes 175_1 and 175_2 may be formed in the passivation layer 171, the color filter layer 172 and the second insulating layer 173.

More specifically, the first contact hole 174_1, which exposes parts of the first and third drain electrodes 166_1 and 166_3, may be formed in the passivation layer 171, the color filter layer 172 and the second insulating layer 173. The first contact hole 174_1 may be formed to penetrate the passivation layer 171, the color filter layer 172 and the second insulating layer 173. Parts of the first and third drain electrodes 166_1 and 166_3 and the first sub-pixel electrode 180_1, which is disposed on the second insulating layer 173, may be physically connected to each other via the first contact hole 174_1.

The second contact hole 174_2, which exposes a part of the second drain electrode 166_2, may be formed in the passivation layer 171, the color filter layer 172 and the second insulating layer 173. The second contact hole 174_2 may be formed to penetrate the passivation layer 171, the color filter layer 172 and the second insulating layer 173. A part of the second drain electrode 166_2 and the second sub-pixel electrode 180_2, which is disposed on the second insulating layer 173, may be physically connected to each other via the second contact hole 174_2.

The pixel electrode 180 and a shielding electrode 189 are disposed on the second insulating layer 173. The pixel electrode 180 and the shielding electrode 189 may be disposed on the same plane to not overlap each other.

The pixel electrode 180 includes the first and second sub-pixel electrodes 180_1 and 180_2, which are physically separated, and electrically isolated, from each other. The first sub-pixel electrode 180_1 may be physically connected to the first and third drain electrodes 166_1 and 166_3 via the first contact hole 174_1, and may be provided with a voltage whose level is between the data voltage and the sustain voltage. The second sub-pixel electrode 180_2 may be physically connected to the second drain electrode 166_2 and may be provided with the data voltage.

The first and second sub-pixel electrodes 180_1 and 180_2 may be formed of a transparent conductive material such as indium tin oxide (ITO), indium zinc oxide (IZO), indium tin zinc oxide (ITZO), or aluminum (Al)-doped zinc oxide (AZO).

Since the pixel electrode 180 is divided into first and second sub-pixel electrodes 180_1 and 180_2, the active region 11 may also be divided into a first sub-active region 11_1 in which the first sub-pixel electrode 180_1 is disposed and a second sub-active region 11_2 in which the second sub-pixel electrode 180_2 is disposed.

As mentioned above, in response to the data voltage being provided to the data line 162, the first sub-pixel electrode 180_1 may be provided with a lower voltage than the second sub-pixel electrode 180_2. As a result, the first sub-active region 11_1 where the first sub-pixel electrode 180_1 is disposed may appear darker than the second sub-active region 11_2 where the second sub-pixel electrode 180_2 is disposed.

Most parts of the first and second sub-pixel electrodes 180_1 and 180_2 may be located inside the first and second sub-active regions 11_1 and 11_2, but some parts of the first and second sub-pixel electrodes 180_1 and 180_2 may be located outside the first and second sub-active regions 11_1 and 11_2 for connection to the first, second and third drain electrodes 166_1, 166_2 and 166_3. For example, first and second extension electrodes 183_1 and 183_2 that will be described later may be provided outside the first and second sub-active regions 11_1 and 11_2, respectively.

The first sub-pixel electrode 180_1 will hereinafter be described.

A first sub-active region 11_1 in which the first sub-pixel electrode 180_1 is disposed may be divided into four sub-regions. The four sub-regions may correspond to four quadrants, respectively, of the first sub-active region 11_1, and the upper right, upper left, lower left and lower right quadrants of the first sub-active region 11_1 may be defined as first, second, third and fourth domains DM1, DM2, DM3 and DM4, respectively.

The first, second, third and fourth domains DM1, DM2, DM3 and DM4 may all have the same area and the same shape.

The first sub-pixel electrode 180_1 may be in symmetry with respect to the boundary between the first and second domains DM1 and DM2 and the boundary between the third and fourth domains DM3 and DM4. Also, the pixel electrode 180 may be in symmetry with respect to the boundary between the second and third domains DM2 and DM3 and the boundary between the first and fourth domains DM1 and DM4.

The first sub-pixel electrode 180_1 may include first sub-pixel slits 185_1, which are openings where the transparent conductive material of the pixel electrode 180 is not provided. Due to the presence of the first sub-pixel slits 185_1, patterns may be formed on the first sub-pixel electrode 180_1, and the directions in which, and the degree to which, nearby liquid crystal molecules 210 are tilted may be controlled by the shape and the patterns of the first sub-pixel electrode 180_1.

The first sub-pixel electrode 180_1 includes a first stem electrode 181_1, a plurality of first branch electrodes 182_1 and the first extension electrode 183_1.

All the elements of the first sub-pixel electrode 180_1 except for the first extension electrode 183_1 may be disposed in the first sub-active region 11_1, and the first extension electrode 183_1 may be disposed outside the first sub-active region 11_1.

The first stem electrode 181_1 may extend in the first and second directions D1 and D2 and may be disposed across the first sub-active region 11_1. The first stem electrode 181_1 may be formed in a cross shape (+) along the common boundaries of the first, second, third and fourth domain regions DM1, DM2, DM3 and DM4.

The first branch electrodes 182_1 may extend from the first stem electrode 181_1 along a direction not parallel to the first or second direction D1 or D2. The first branch electrodes 182_1 may extend in different directions in different domains. More specifically, the first branch electrodes 182_1 may extend along an upper right direction in the first domain DM1, along an upper left direction in the second domain DM2, along a lower left direction in the third domain DM3 and along a lower right direction in the fourth domain DM4.

The first extension electrode 183_1 may be disposed outside the first sub-active region 11_1. The first extension electrode 183_1 may extend from some of the first branch electrodes 182_1 and may be disposed to overlap the first contact hole 174_1. The first extension electrode 183_1 may be physically connected to the first and third drain electrodes 166_1 and 166_3 via the first contact hole 174_1 and may be provided with a voltage whose level is between the data voltage and the sustain voltage. The voltage provided to the first extension electrode 183_1 may be transmitted to the other elements of the first sub-pixel electrode 180_1, i.e., the first stem electrode 181_1 and the first branch electrodes 182_1, via the first extension electrode 183_1.

The first extension electrode 183_1 includes first and second extensions 183_11 and 183_12. The first extension 183_11 is a part of the first extension electrode 183_1 substantially overlapping the first contact hole 174_1, and the second extension 183_12 is an extension of the first extension 183_11 for connection to the first branch electrodes 182_1.

The second extension 183_12 may be disposed to overlap a sustain electrode and may have a larger area than the first extension 183_11 to overlap the sustain electrode and thus to form a predetermined amount of capacitance. In a case in which the second extension 183_12 overlaps the sustain electrode to form a capacitance, a sudden drop in the voltage provided to the first sub-pixel electrode 180_1 may be prevented.

Some of the first branch electrodes 182_1 may extend from the first stem electrode 181_1 to be connected to the first extension electrode 183_1. More specifically, some of the first branch electrodes 182_1 may be directly connected to the second extension 183_12 of the first extension electrode 183_1, and the first branch electrodes 182_1 connected to the second extension 183_12 may extend in a straight line from the first stem electrode 181_1 without being bent. Thus, the liquid crystal molecules 210 may be aligned along the direction in which the first branch electrodes 182_1 are arranged in a region where the first branch electrodes 182_1 are placed in contact with the second extension 183_12, and this will be described later in detail.

The first and second extensions 183_11 and 183_12 may be disposed side-by-side along edges formed by the first stem electrode 181_1 and/or edge electrodes 186 (to be described further below). That is, the first and second extensions 183_11 and 183_12 may be disposed side-by-side along one edge of the first sub-active region 11_1.

The second extension 183_12 includes a first extension slit 184_1. The first extension slit 184_1 may be an opening extending not in parallel to the first branch electrodes 182_1 connected to the second extension 183_12. In a case in which an electric field is formed in the liquid crystal layer 200 in response to a voltage being provided to the pixel electrode 180, the first extension slit 184_1 may control the liquid crystal molecules 210 laid over, or disposed adjacent to, the second extension 183_12 to be tilted in a particular direction. Due to the presence of the first extension slit 184_1, a controlling force for the liquid crystal molecules 210, generated along this particular direction, may minimize the misalignment of the liquid crystal molecules 210 in a region near the second extension 183_12 and may strengthen a restoring force for the liquid crystal molecules 210. That is, the controlling and restoring forces for the liquid crystal molecules 210 may both be improved. This will be described later in detail with reference to FIGS. 5 and 6.

The first extension slit 184_1 may be disposed near extensions of the first branch electrodes 182_1 connected to the first extension electrode 183_1. More specifically, the first extension slit 184_1 may be provided to minimize the misalignment of the liquid crystal molecules 210 in a region along a line of contact between the second extension 183_12 of the first extension electrode 183_1 and the first branch electrodes 182_1. Thus, the first extension slit 184_1 may be disposed near the line of contact between the second extension 183_12 and the first branch electrodes 182_1. As a result, the first extension slit 184_1 may be thought of as being disposed on extensions of the first branch electrodes 182_1 connected to the second extension 183_12.

The above description of the first sub-pixel electrode 180_1 may be largely, but not completely, applicable to the second sub-pixel electrode 180_2.

More specifically, the voltage provided to the first sub-pixel electrode 180_1 and the voltage provided to the second sub-pixel electrode 180_2 may differ from each other, the first sub-pixel electrode 180_1 may be connected to the first and third TFTs 167_1 and 167_3, and the second sub-pixel electrode 180_2 may be connected to the second TFT 167_2. However, the first and second sub-pixel electrodes 180_1 and 180_2 may generally have similar shapes.

The second sub-pixel electrode 180_2 may be connected to the second drain electrode 166_2 of the second TFT 167_2 via the second contact hole 174_2 and may be disposed in the second sub-active region 11_2. The second sub-active region 11_2, like the first sub-active region 11_1 which is divided into four domains, i.e., the first, second, third and fourth domains DM1, DM2, DM3 and DM4, may also be divided into four domains, i.e., fifth, sixth, seventh and eighth domains. The second sub-pixel electrode 180_2 may include a second stem electrode 181_2, a plurality of second branch electrodes 182_2 and a second extension electrode 183_2. Although not specifically illustrated, the second extension electrode 183_2 may include an element similar to the first extension slit 184_1, and this will be described later in detail.

The shielding electrode 189 is disposed on the same layer as the pixel electrode 180. The shielding electrode 189 may be disposed to adjoin the pixel electrode 180 or to be a predetermined distance apart from the pixel electrode 180, and may not be physically and electrically connected to the pixel electrode 180. Accordingly, the data voltage provided to the pixel electrode 180 may not be transmitted to the shielding electrode 189.

The shielding electrode 189 may be formed of a transparent conductive material such as ITO, IZO, ITZO, or AZO and may comprise the same material as the pixel electrode 180.

The shielding electrode 189 may be disposed to overlap an entire non-active region (i.e., an entire display region except for the first and second sub-active regions 11_1 and 11_2) excluding regions where parts of the pixel electrode 180, particularly the first and second extension electrodes 183_1 and 183_2, are provided. However, the present disclosure is not limited thereto. That is, the shielding electrode 189 may not necessarily overlap the entire non-active region except for the region where the pixel electrode 180 is disposed. Other regions may also remain exposed from under the shielding electrode 189.

The shielding electrode 189 may also be disposed to overlap the data line 162. Thus, liquid crystal molecules 210 which overlap the data line 162 may be prevented from being affected by the data voltage provided to the data line 162, and as a result, light leakage may be prevented.

A first alignment layer (not illustrated) may be disposed on the pixel electrode 180 and the shielding electrode 189. The first alignment layer may control the initial alignment angle of the liquid crystal molecules 210 injected into the liquid crystal layer 200.

The second display substrate 300 will hereinafter be described.

The second display substrate 300 may include a second base substrate 310, a light-shielding member 320, an overcoat layer 330 and a common electrode 340.

The second base substrate 310 may be disposed to face the first base substrate 110. The second base substrate 310 may be durable enough to withstand external shock. The second base substrate 310 may be a transparent insulating substrate. For example, the second base substrate 310 may be a glass substrate, a quartz substrate, a transparent resin substrate, or the like. The second base substrate 310 may be in the shape of a flat plate, or may be curved in a particular direction.

The light-shielding member 320 is disposed on a surface of the second base substrate 310 that faces the first display substrate 100. In some exemplary embodiments, the light-shielding member 320 may be disposed to overlap the gate line 122, the data line 162, the first, second and third TFTs 167_1, 167_2 and 167_3, the first and second contact holes 174_1 and 174_2 and the first and second sustain contact holes 175_1 and 175_2. In other words, the light-shielding member 320 may be disposed to overlap the non-active region, which is the region outside the active region 11, and may block the transmission of light in the non-active region. However, the present disclosure is not limited to these exemplary embodiments. That is, in some other exemplary embodiments, the light-shielding member 320 may be disposed in the entire non-active region except for a part of the data line 162 near the pixel electrode 180. In this case, the light-shielding member 320 may be in the shape of stripes extending in the first or second direction D1 or D2 in a plan view, and a part of the data line 162 not overlapped by the light-shielding member 320 may be overlapped by the shielding electrode 189 to block the transmission of light therethrough.

The overcoat layer 330 is disposed on a surface of the light-shielding member 320 that faces the first display substrate 100. The overcoat layer 330 may reduce any height difference generated by the light-shielding member 320. In some exemplary embodiments, the overcoat layer 330 may not be provided.

The common electrode 340 is disposed on a surface of the overcoat layer 330 that faces the first display substrate 100.

The common electrode 340 may be formed of a transparent conductive material such as ITO, IZO, ITZO, or AZO.

The common electrode 340 may be formed on substantially the entire surface of the second base substrate 310 as a plate. A common voltage provided by an external source may be provided to the common electrode 340, and thus, the common electrode 340 may form an electric field in the liquid crystal layer 200 together with the pixel electrode 180. In some exemplary embodiments, openings may be formed in the common electrode 340 to form particular patterns in the common electrode 340.

The common voltage may be provided by an external source, and the level of the common voltage may be uniformly maintained while the LCD device according to the present exemplary embodiment is operating. Accordingly, an electric field may be formed in the space between the overlapping pixel electrode 180 and the common electrode 340, due to a difference between the data voltage provided to the pixel electrode 180 and the common voltage provided to the common electrode 340. Due to this electric field, the liquid crystal molecules 210 may rotate or may be tilted.

In some exemplary embodiments, a voltage having substantially the same level as the common voltage may be provided to the shielding electrode 189. Thus, no electric field may be formed in a part of the liquid crystal layer 200 between the overlapping shielding electrode 189 and common electrode 340, because the shielding electrode 189 and the common electrode 340 are provided with signals having the same voltage and thus, no electric potential is generated therebetween. Accordingly, the liquid crystal molecules 210 may not rotate or may not be tilted in the space between the shielding electrode 189 and the common electrode 340, and may maintain the same state as that in a case in which the LCD device according to the present exemplary embodiment is powered off. As a result, the liquid crystal molecules 210 may block the transmission of light.

A second alignment layer (not illustrated) may be disposed on a surface of the common electrode 340 that faces the first display substrate 100. The second alignment layer, like the first alignment layer, may control the initial alignment angle of the liquid crystal molecules 210 in the liquid crystal layer 200.

The liquid crystal layer 200 will hereinafter be described.

The liquid crystal layer 200 includes liquid crystal molecules 210 which have dielectric anisotropy and refractive anisotropy. The liquid crystal molecules 210 may be aligned in a vertical direction with respect to the first and second display substrates 100 and 300 in the absence of an electric field. In response to an electric field being formed between the first and second display substrates 100 and 300, the liquid crystal molecules 210 may rotate, or may be tilted, in a particular direction between the first and second display substrates 100 and 300, thereby changing the polarization of light.

It will hereinafter be described how the LCD device according to the present exemplary embodiment can improve the controlling and restoring forces for the liquid crystal molecules 210.

Figure 5:
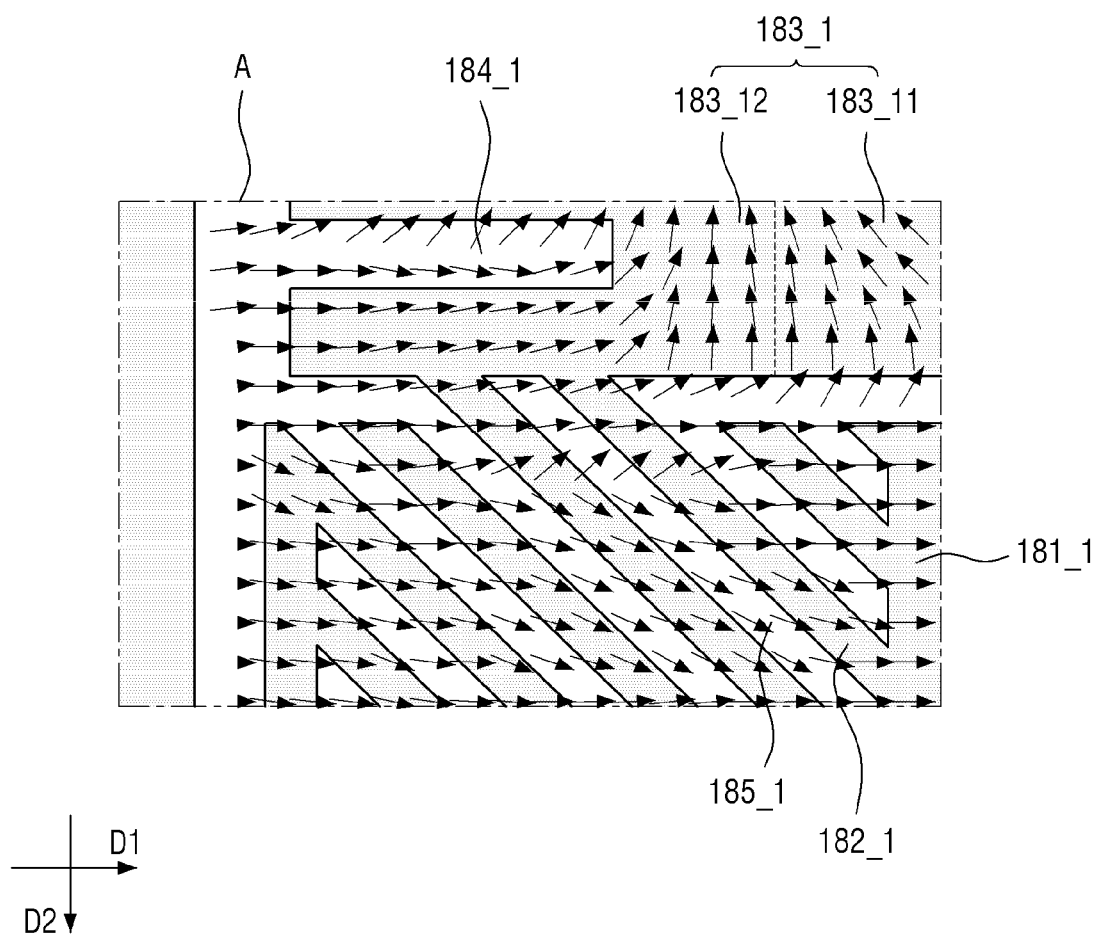
FIG. 5 is a layout view illustrating a first sub-pixel electrode in an area A of FIG. 1.
Figure 6:
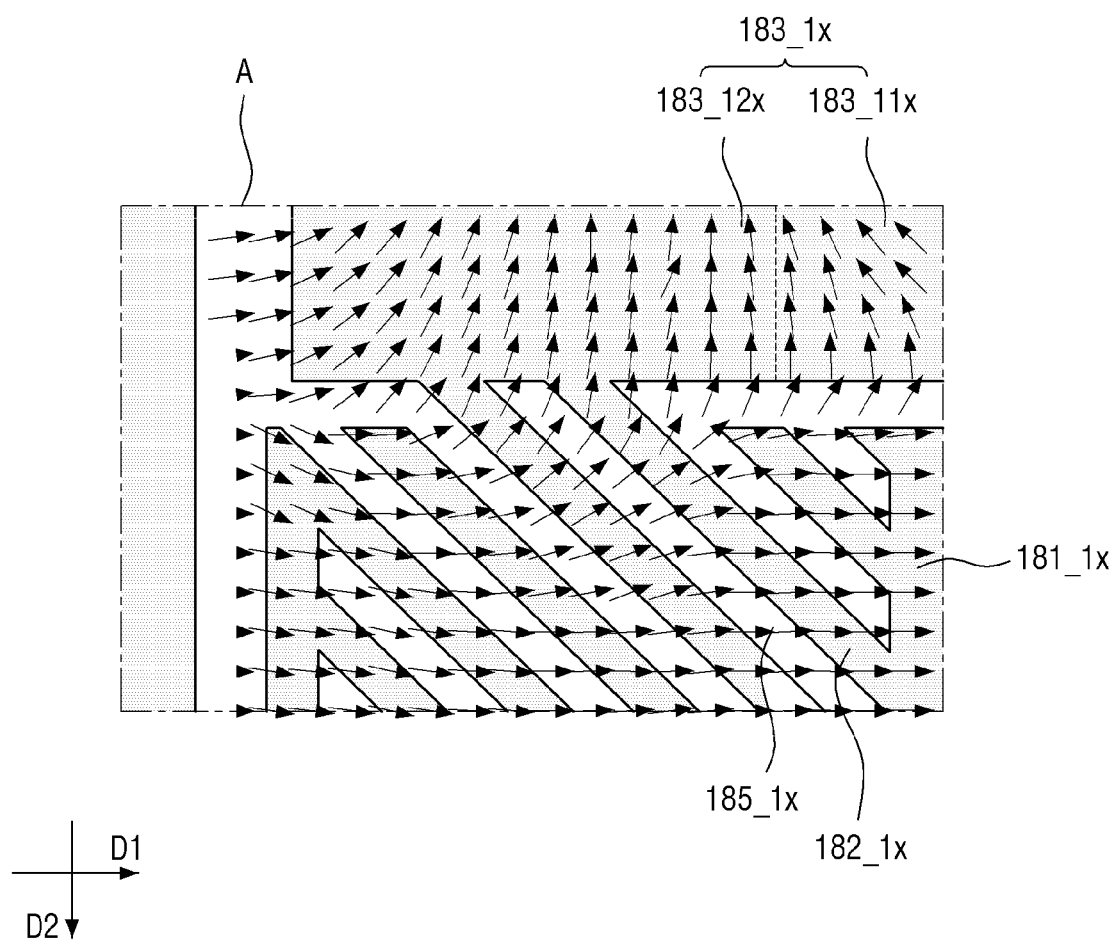
FIG. 6 is a layout view illustrating a first sub-pixel electrode for comparison with the first sub-pixel electrode of FIG. 5.

FIG. 5 is a layout view illustrating a first sub-pixel electrode in an area A of FIG. 1, and FIG. 6 is a layout view illustrating a first sub-pixel electrode for comparison with the first sub-pixel electrode of FIG. 5.

For convenience, only the layer including the first sub-pixel electrode 180_1 of FIG. 1 is illustrated in FIGS. 5 and 6. Referring to FIGS. 5 and 6, arrows indicate directions in which the liquid crystal molecules 210 are tilted in response to an electric field being applied in the area A by the first sub-pixel electrode 180_1. Directional terms such as "top," "bottom," "upper," "lower," "above," "below," "left," and "right, as used herein, are defined based on directions shown in the drawings.

Referring to FIG. 5, the first extension electrode 183_1 of the LCD device according to the present exemplary embodiment includes the first extension slit 184_1. On the other hand, referring to FIG. 6, a first extension electrode 183_1x of an LCD device according to a comparative example, unlike the first extension electrode 183_1, does not include the first extension slit 184_1.

Referring to FIG. 5, due to the presence of the first extension slit 184_1, liquid crystal molecules 210 in a region near an upper side of the first extension slit 184_1 are provided with an upward force, and liquid crystal molecules 210 in a region near a lower side of the first extension slit 184_1 are provided with a downward force. The liquid crystal molecules 210 in the region near the lower side of the first extension slit 184_1 may be controlled to be tilted in a rightward direction, as illustrated in FIG. 5, not only due to the influence of control force from the first extension slit 184_1, but also due to the presence of the first extension 183_11 and the first contact hole 175_1 in the first extension 183_11.

The more the liquid crystal molecules 210 are controlled to be tilted toward the center of the first or second sub-active region 11_1 or 11_2, the better the controlling and restoring forces for the liquid crystal molecules 210 become. Accordingly, the more the liquid crystal molecules 210 of FIG. 5 are controlled to be tilted in a lower right direction, which is a direction toward the center of the first sub-active region 11_1, the better the controlling and restoring forces for the liquid crystal molecules 210 become.

Referring to FIG. 5, due to the presence of the first extension slit 184_1, the liquid crystal molecules 210 in the region near the lower side of the first extension slit 184_1 may be provided with a downward force. Thus, liquid crystal molecules 210 laid over the first branch electrodes 182_1 connected to the second extension 183_12 may be controlled to be tilted in the lower right direction. That is, improved controlling and restoring forces for the liquid crystal molecules 210 may be obtained. The liquid crystal molecules 210 in the region near the upper side of the first extension slit 184_1 are controlled to be tilted in an upward direction, but may not cause a problem because they are covered by the light-shielding member 320 and are thus hidden from view.

On the other hand, referring to FIG. 6, liquid crystal molecules 210 may be controlled to be tilted toward the center of a first extension electrode 183_1x. Since a height difference is formed in a first extension 183_11x due to the presence of a first contact hole 174_1, the liquid crystal molecules 210 may be controlled to be tilted toward the first contact hole 174_1. Accordingly, liquid crystal molecules 210 laid over a second extension 183_12x may be controlled to be tilted in the upward direction. As a result, liquid crystal molecules 210 laid over first branch electrodes 182_1x connected to the second extension 183_12x may be controlled to be tilted in an upper right direction or in the upward direction, rather than in a rightward direction or the lower right direction.

According to the present exemplary embodiment, the more the liquid crystal molecules 210 are controlled to be tilted toward the center of the first or second sub-active region 11_1 or 11_2, the better the controlling and restoring forces for the liquid crystal molecules 210 become. The liquid crystal molecules 210 of FIG. 5 are controlled to be tilted in a rightward or lower right direction, but the liquid crystal molecules 210 of FIG. 6 are controlled to be tilted in an upper right direction. That is, the second extension 183_12 including the first extension slit 184_1 can properly control the liquid crystal molecules 210 near the intersection of the first branch electrodes 182_1 and the first extension electrode 183_1, so as to be tilted toward the center of the first sub-active region 11_1. In contrast, the second extension 183_12x of FIG. 6 has no particular opening, and thus cannot control its liquid crystal molecules 210 as well near the intersection of the first branch electrodes 182_1x and the first extension electrode 183_11x. Accordingly, the structure shown in FIG. 5 can provide better controlling and restoring forces for the liquid crystal molecules 210 than the structure shown in FIG. 6.

As illustrated in FIG. 5, the liquid crystal molecules 210 in the region near the upper side of the first extension slit 184_1, like the liquid crystal molecules 210 in a corresponding region in FIG. 6, are controlled to be tilted in the upward direction, but may not cause a problem because they are covered by the light-shielding member 320 and are thus hidden from view.

As illustrated in FIG. 5, even though the first extension electrode 183_1 is covered by the light-shielding element 320 and is thus hidden from view, the region where the first extension electrode 183_1 is connected to some of the first branch electrodes 182_1 is not completely covered by the light-shielding member 320 and may thus be viewed from outside the LCD device according to the present exemplary embodiment. However, due to the presence of the extension slit 184_1, controlling and restoring forces for the liquid crystal molecules 210 may be improved, and as a result, light leakage may be minimized.

In short, since the first extension electrode 183_1 includes the first extension slit 184_1, the controlling and restoring forces for the liquid crystal molecules 210 may be improved, and as a result, light leakage may be minimized.

FIGS. 5 and 6 illustrate exemplary directions in which the liquid crystal molecules 210 are tilted in response to a data voltage having a particular level being provided to the first sub-pixel electrode 180_1, but the actual tilt directions of the liquid crystal molecules 210 are not particularly limited to those illustrated in FIG. 5 or 6. That is, as the level of the data voltage provided to the first sub-pixel electrode 180_1 changes, the degree to which, and the directions in which, the liquid crystal molecules 210 are tilted may change accordingly. Also, the arrangement of the liquid crystal molecules 210 may differ from one pixel 10 to another pixel 10 regardless of whether the same data voltage is provided to each and every pixel 10. The exact same arrangement of the liquid crystal molecules 210 as that illustrated in FIG. 5 or 6 may not be able to be obtained even when the data voltage having the particular level is provided to the first sub-pixel electrode 180_1 again. That is, the pattern of the arrangement of the liquid crystal molecules 210 of FIG. 5 or 6 is merely exemplary for the purpose of describing the benefits of the present exemplary embodiment, such as improving the controlling and restoring forces for the liquid crystal molecules 210, and thus, the actual pattern of the arrangement of the liquid crystal molecules 210 may differ from that illustrated in FIG. 5 or 6. However, the general pattern of the arrangement of the liquid crystal molecules 210 is as described above with reference to FIGS. 5 and 6, and thus, the benefits of the present exemplary embodiment are apparent from the above description with reference to FIGS. 5 and 6.

In the pixel 10 of the LCD device according to the exemplary embodiment of FIG. 1, the pixel electrode 180 is divided into the first and second sub-pixel electrodes 180_1 and 180_2, and the active region 11 is divided into the first and second sub-active regions 11_1 and 11_2. However, the present disclosure is not limited to this configuration. That is, in an alternative exemplary embodiment, the pixel 10 may include only the first sub-pixel electrode 180_1 and the first sub-active region 11_1, and may include only the first TFT 167_1 and the first contact hole 174_1 accordingly. In this alternative exemplary embodiment, like in the exemplary embodiment of FIGS. 1 through 6, the first sub-pixel electrode 180_1 may include the first extension slit 184_1 and may thus provide improved controlling and restoring forces for the liquid crystal molecules 210.

Figure 7:
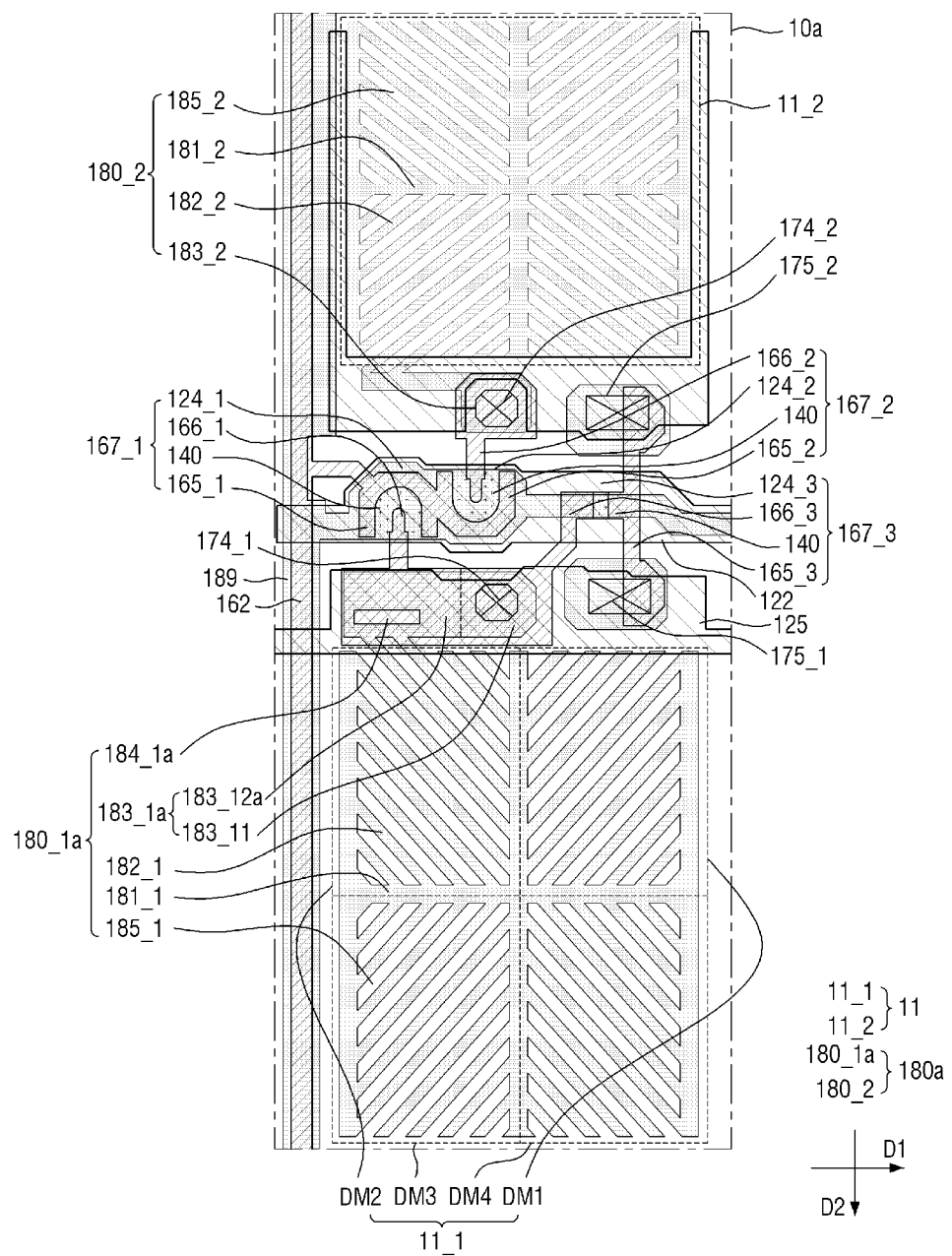
FIG. 7 is a layout view of a pixel of an LCD device according to another exemplary embodiment of the present disclosure.

FIG. 7 is a layout view of a pixel of an LCD device according to another exemplary embodiment of the present disclosure.

A pixel 10a of an LCD device according to the present exemplary embodiment differs from the pixel 10 of the LCD device according to the exemplary embodiment of FIG. 1 in terms of the shape of a first extension slit 184_1a. The LCD device according to the present exemplary embodiment will hereinafter be described, focusing mainly on differences from the LCD device according to the exemplary embodiment of FIG. 1.

The first extension slit 184_1 of FIG. 1 is formed as an indentation or recess in the outer edge of second extension 183_12. In contrast, the first extension slit 184_1a of FIG. 7 may be formed as an island-shaped opening within a second extension 183_12a. Accordingly, since the first extension slit 184_1a is formed within the second extension 183_12a regardless of which part of the second extension 183_12a first branch electrodes 182_1 are connected to, controlling and restoring forces for liquid crystal molecules 210 may be improved by the first extension slit 184_1a.

Figure 8:
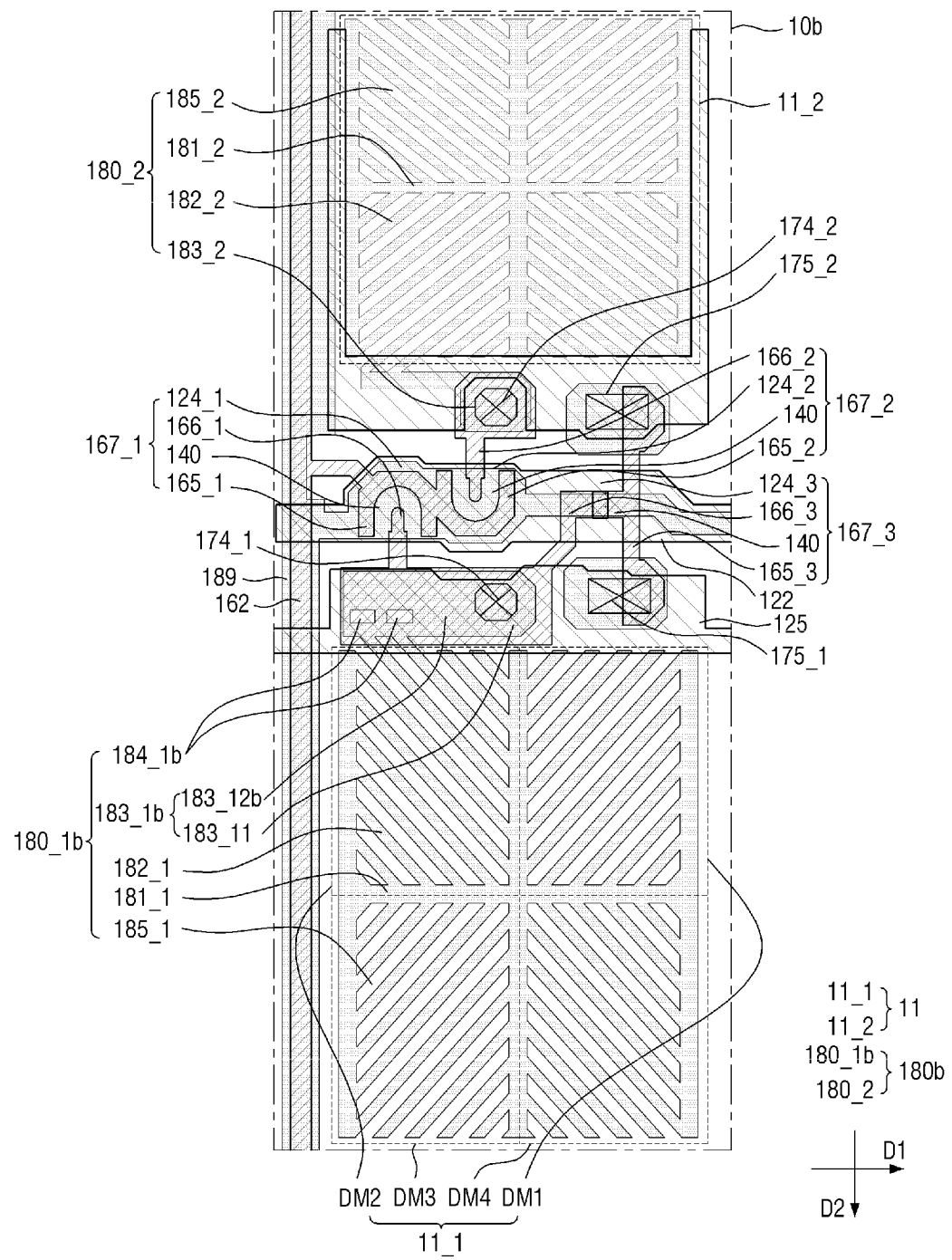
FIG. 8 is a layout view of a pixel of an LCD device according to another exemplary embodiment of the present disclosure.

FIG. 8 is a layout view of a pixel of an LCD device according to another exemplary embodiment of the present disclosure.

A pixel 10b of an LCD device according to the present exemplary embodiment differs from the pixel 10 of the LCD device according to the exemplary embodiment of FIG. 7 in terms of the number of first extension slits 184_1b. The LCD device according to the present exemplary embodiment will hereinafter be described, focusing mainly on differences with the LCD device according to the exemplary embodiment of FIG. 7.

Referring to FIG. 8, the pixel 10b, unlike the pixel 10a of FIG. 7 which includes a single opening as the first extension slit 184_1a, may include a plurality of openings or first extension slits 184_1b. each of these first extension slits 184_1b lies entirely within the second extension 183_12b.

Figure 9:
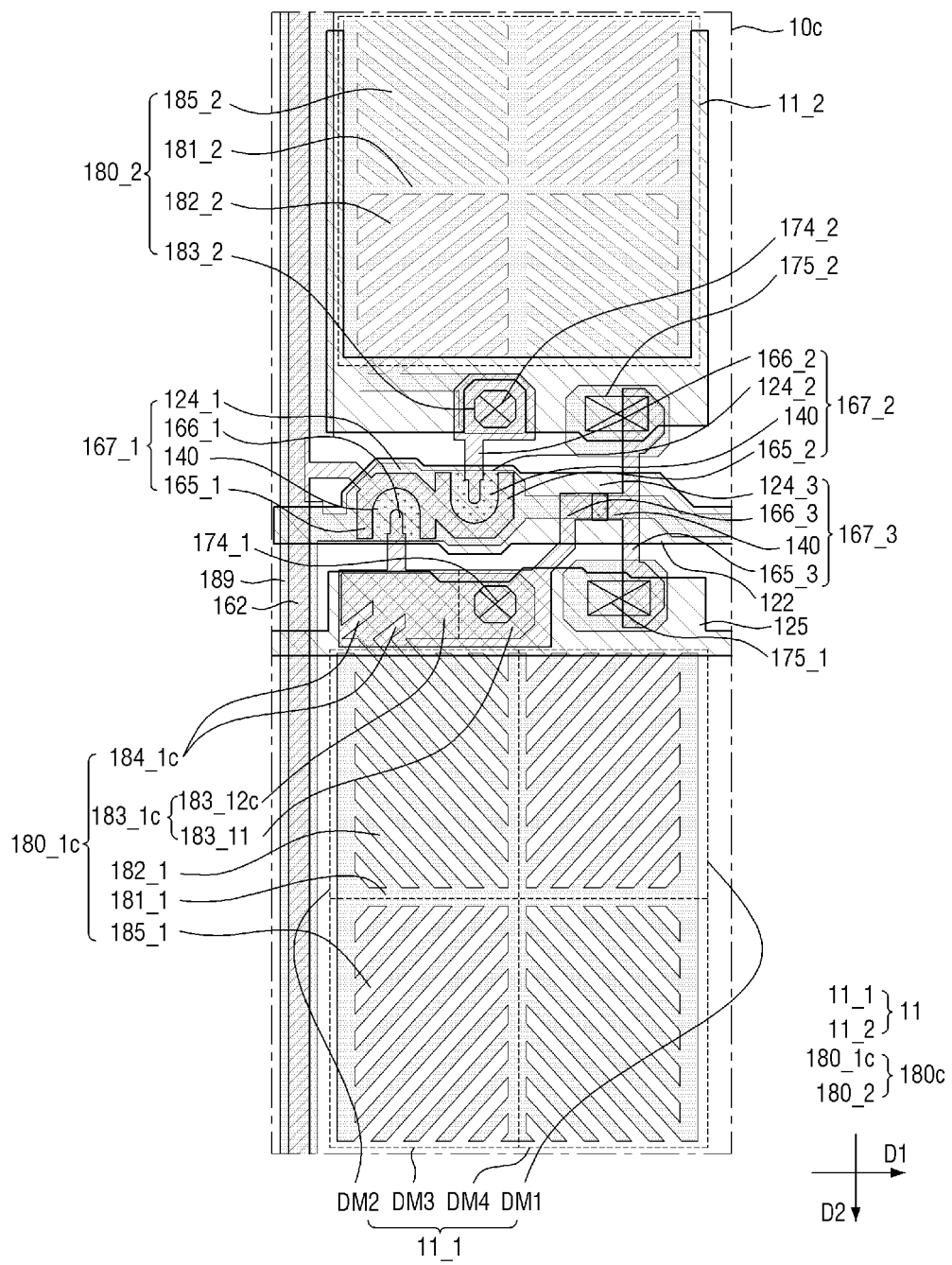
FIG. 9 is a layout view of a pixel of an LCD device according to another exemplary embodiment of the present disclosure.

FIG. 9 is a layout view of a pixel of an LCD device according to another exemplary embodiment of the present disclosure.

A pixel 10c of an LCD device according to the present exemplary embodiment differs from the pixel 10 of the LCD device according to the exemplary embodiment of FIG. 1 in terms of the number and shape of first extension slits 184_1c. The LCD device according to the present exemplary embodiment will hereinafter be described, focusing mainly on differences with the LCD device according to the exemplary embodiment of FIG. 1.

Referring to FIG. 9, the first extension slits 184_1c may extend at a right angle with respect to the direction in which first branch electrodes 182_1 connected to a first extension electrode 183_1c extend. Accordingly, liquid crystal molecules 210 in a region near the first extension slits 184_1c may be controlled to be tilted in a direction perpendicular to edges of the first extension slits 184_1c, i.e., in the direction in which the first branch electrodes 182_1 extend. As a result, controlling and restoring forces for liquid crystal molecules 210 by the first extension slits 184_1c may be improved.

Figure 10:
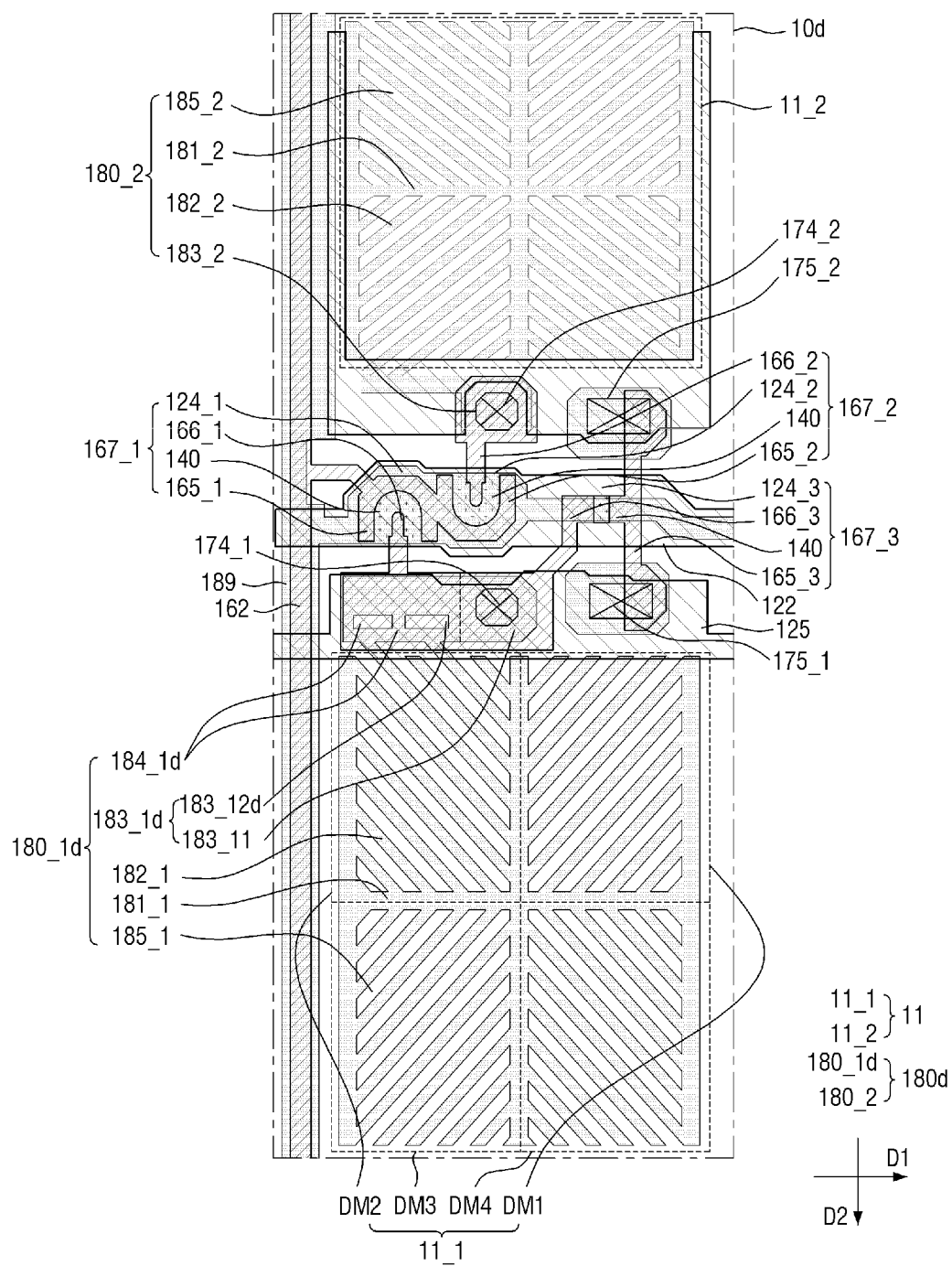
FIG. 10 is a layout view of a pixel of an LCD device according to another exemplary embodiment of the present disclosure.

FIG. 10 is a layout view of a pixel of an LCD device according to another exemplary embodiment of the present disclosure.

A pixel 10d of an LCD device according to the present exemplary embodiment differs from the pixel 10b of the LCD device according to the exemplary embodiment of FIG. 8 in terms of the arrangement of first branch electrodes 182_1 connected to a first extension electrode 183_1d. The LCD device according to the present exemplary embodiment will hereinafter be described, focusing mainly on differences with the LCD device according to the exemplary embodiment of FIG. 8.

Referring to FIG. 10, two first branch electrodes 182_1 with another first branch electrode 182_1 interposed therebetween, rather than two adjacent first branch electrodes 182_1, may be connected to the first extension electrode 183_1d. That is, alternating first branch electrodes 182_1 are not connected to the first extension electrode 183_1d. Accordingly, first extension slits 184_1d may be spaced apart by as much as the distance between those first branch electrodes 182_1 connected to the first extension electrode 183_1d.

Figure 11:
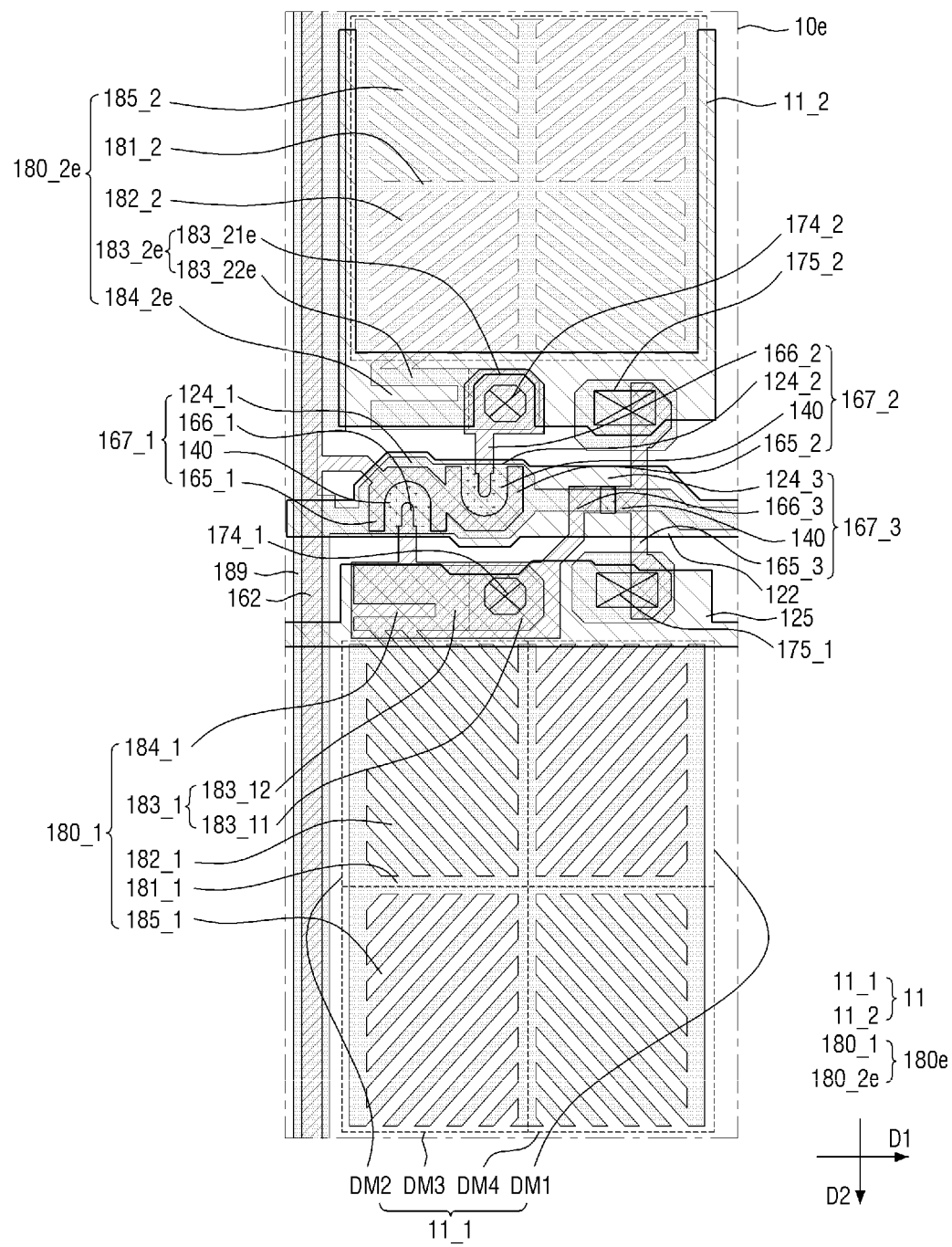
FIG. 11 is a layout view of a pixel of an LCD device according to another exemplary embodiment of the present disclosure.

FIG. 11 is a layout view of a pixel of an LCD device according to another exemplary embodiment of the present disclosure.

A pixel 10e of an LCD device according to the present exemplary embodiment differs from the pixel 10 of the LCD device according to the exemplary embodiment of FIG. 1 in that a second extension slit 184_2e is additionally provided in a second sub-pixel electrode 180_2e. The LCD device according to the present exemplary embodiment will hereinafter be described, focusing mainly on differences with the LCD device according to the exemplary embodiment of FIG. 1.

Referring to FIG. 11, the second sub-pixel electrode 180_2e includes a second stem electrode 181_2, second branch electrodes 182_2 and the second extension electrode 183_2e. The descriptions of the first stem electrode 181_1, the first branch electrodes 182_1 and the first extension electrode 183_1 of FIG. 1 may be directly applicable to the second stem electrode 181_2, the second branch electrodes 182_2 and the second extension electrode 183_2e. The second extension electrode 183_2e may be connected to a second drain electrode 166_2 of a second TFT 167_2 via a second contact hole 174_2.

The second extension electrode 183_2e includes third and fourth extensions 183_21e and 183_22e. The third extension 183_21e is disposed to overlap the second contact hole 174_2, and the fourth extension 183_22e corresponds to an extension of the third extension 183_21e for connection to some of the second branch electrodes 182_2. That is, the description of the first extension 183_11 of FIG. 1 may be directly applicable to the third extension 183_21e, and the description of the second extension 183_12 of FIG. 1 may be directly applicable to the fourth extension 183_22e.

In the present exemplary embodiment, unlike in the exemplary embodiment of FIG. 1 in which the second extension electrode 183_2 does not include any extension slit, the second extension electrode 183_2e includes the second extension slit 184_2e. Thus, the improvement of controlling and restoring forces for liquid crystal molecules 210 may be achieved not only in a first sub-pixel electrode 180_1 and a first sub-active region 11_1, but also in the second sub-pixel electrode 180_2e and a second sub-active region 11_2.

Figure 12:
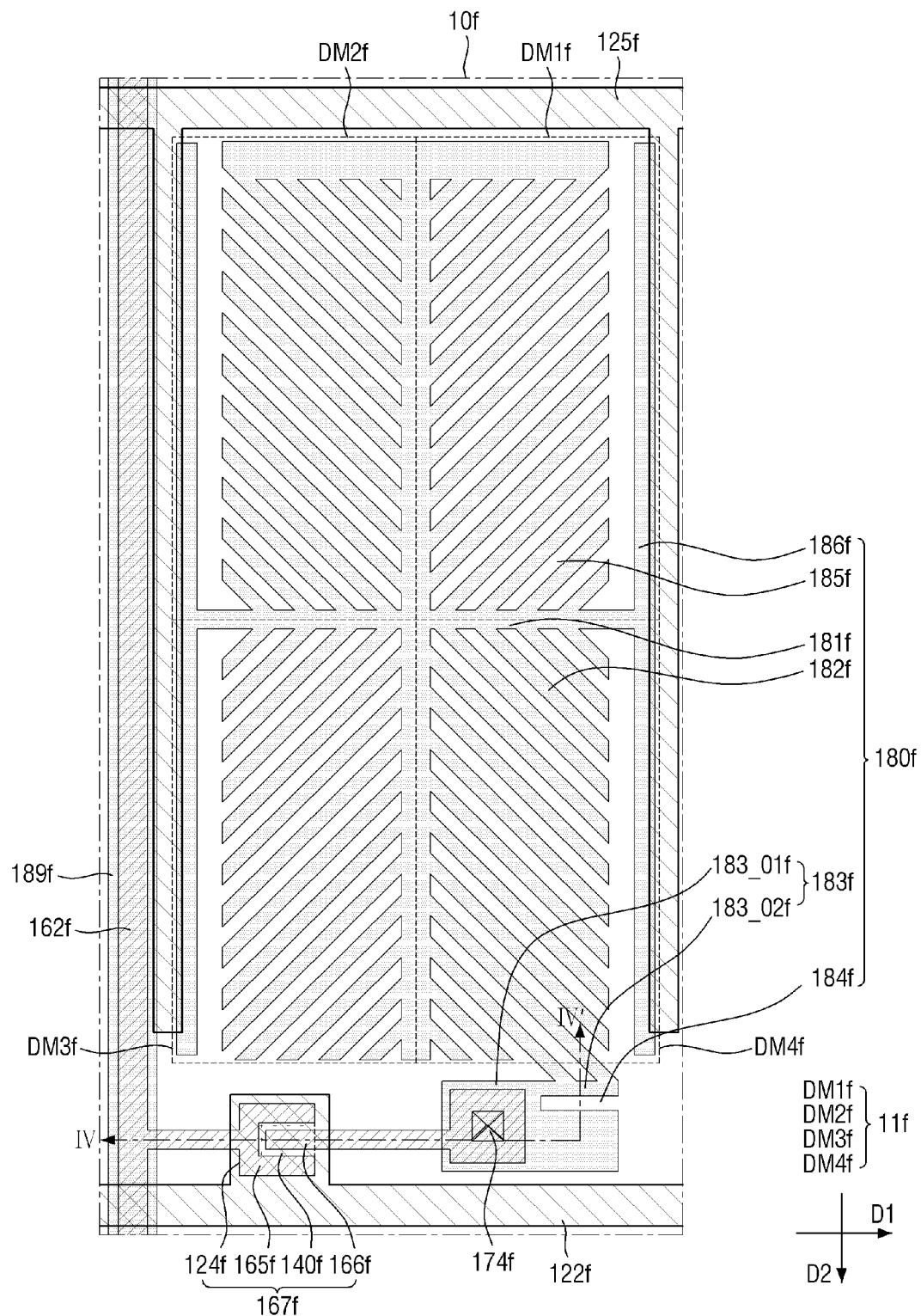
FIG. 12 is a layout view of a pixel of an LCD device according to another exemplary embodiment of the present disclosure.
Figure 13:
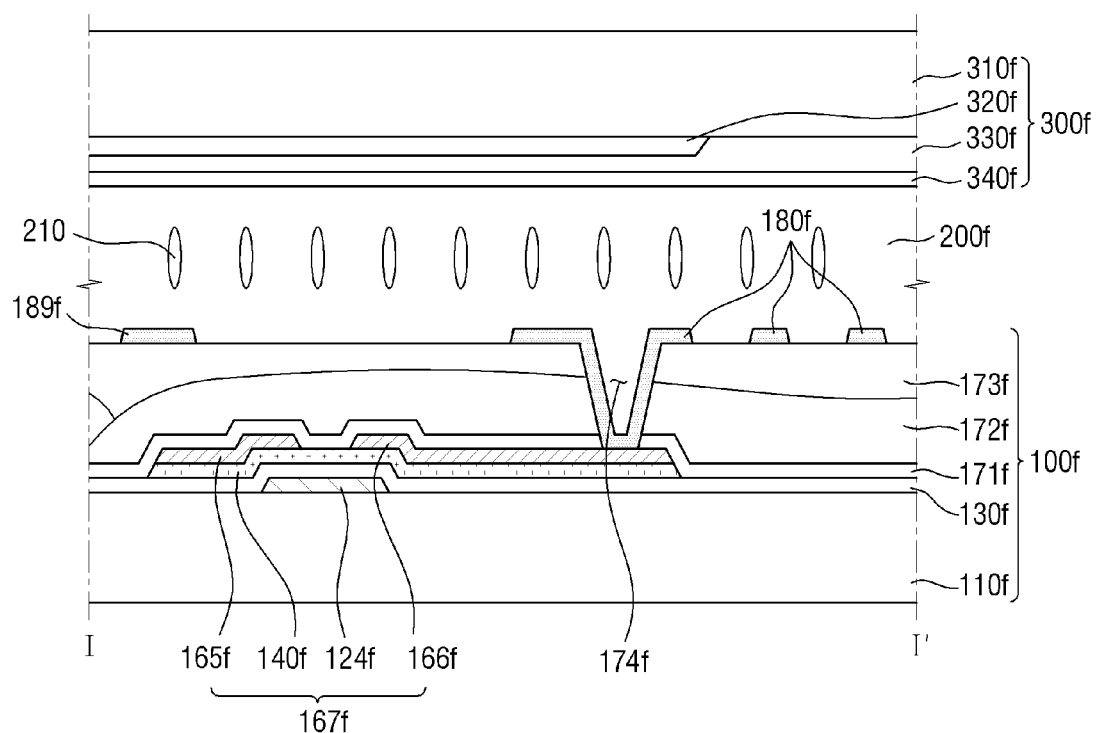
FIG. 13 is a cross-sectional view taken along line IV-IV' of FIG. 12.

FIG. 12 is a layout view of a pixel of an LCD device according to another exemplary embodiment of the present disclosure, and FIG. 13 is a cross-sectional view taken along line IV-IV' of FIG. 1.

A pixel 10f of the LCD device according to the present exemplary embodiment differs from the pixel 10 of the LCD device according to the exemplary embodiment of FIG. 1 in that a pixel electrode 180f is not divided into a plurality of sub-pixel electrodes, such as the first and second sub-pixel electrodes 180_1 and 180_2 of FIG. 1. Also, an active region 11f is not divided into a plurality of sub-active regions, such as the first and second sub-active regions 11_1 and 11_2 of FIG. 2. The pixel 10f of the LCD device according to the present exemplary embodiment not only includes the equivalents of the first stem electrode 181_1, the branch electrodes 182_1, the first extension electrode 183_1 and the first extension slit 184_1 of FIG. 1, but also includes edge electrodes 186f. As the shape of the pixel electrode 180f changes, the shapes of a gate line 122f, a sustain line 125f, a semiconductor layer 140f, a data line 162f, a source electrode 165f, a drain electrode 166f and a contact hole 174f change accordingly, but only slightly in the perspective of FIG. 12, and thus, the descriptions of the gate line 122, the sustain line 125, the semiconductor layer 140, the data line 162, the first, second and third source electrodes 165_1, 165_2 and 165_3, the first, second and third drain electrodes 166_1, 166_2 and 166_3 and the first and second contact hole 174_1 and 174_2 of FIGS. 1 through 4 may be directly applicable to the gate line 122f, the sustain line 125f, the semiconductor layer 140f, the data line 162f, the source electrode 165f, the drain electrode 166f and the contact hole 174f. The LCD device according to the present exemplary embodiment will hereinafter be described, focusing mainly on differences with the LCD device according to the exemplary embodiment of FIG. 1.

Referring to FIGS. 12 and 13, the LCD device according to the present exemplary embodiment includes a first display substrate 100f, a second display substrate 300f and a liquid crystal layer 200f.

A switching device for changing the arrangement of liquid crystal molecules 210 in the liquid crystal layer 200f, for example a TFT 167f, is provided in the first display substrate 100f. In the present exemplary embodiment, only one TFT 167f is provided, whereas in the exemplary embodiment of FIGS. 1 through 4, three TFTs, i.e., the first, second and third TFTs 167_1, 167_2 and 167_3, are provided. The second display substrate 300f is a counter substrate disposed to face the first display substrate 100f.

The LCD device according to the present exemplary embodiment includes multiple pixels 10f, which are arranged in a matrix, and the description of the pixel 10 of FIGS. 1 through 4 may be directly applicable to each pixel 10f.

The first display substrate 100f will hereinafter be described.

The gate line 122f, a gate electrode 124f and the sustain line 125f are provided in the first display substrate 100f. The descriptions of the gate line 122, the second gate electrode 124_2 and the sustain line 125 of FIGS. 1 through 4 may be directly applicable to the gate line 122f, the gate electrode 124f and the sustain line 125f.

A first insulating layer 130f is disposed on the gate line 122f, the gate electrode 124f and the sustain line 125f, and the description of the first insulating layer 130 of FIGS. 1 through 4 may be directly applicable to the first insulating layer 130f.

The data line 162f, the source electrode 165f and the drain electrode 166f are disposed on the semiconductor layer 140f and the first insulating layer 130f. The description of the data line 162 of FIGS. 1 through 4 may be directly applicable to the data line 162f. The description of the second source electrode 165_2 of FIGS. 1 through 4 may be directly applicable to the source electrode 165f. The description of the second drain electrode 166_2 of FIGS. 1 through 4 may be directly applicable to the drain electrode 166f.

The gate electrode 124f, the semiconductor layer 140f, the source electrode 165f and the drain electrode 166f may collectively form the TFT 167f, which is a switching device. In the present exemplary embodiment, unlike in the exemplary embodiment of FIGS. 1 through 4, only one switching device may be provided in one pixel 10f. Accordingly, in a case in which a gate voltage provided to the gate electrode 124f has a level turning on the TFT 167f, a data voltage provided to the data line 162f may be transmitted to the drain electrode 166f via the source electrode 165f.

A passivation layer 171f is disposed on the first insulating layer 130f and the TFT 167f, and the description of the passivation layer 171 of FIGS. 1 through 4 may be directly applicable to the passivation layer 171f.

A color filter layer 172f is disposed on the passivation layer 171f, and the description of the color filter layer 172 of FIGS. 1 through 4 may be directly applicable to the color filter layer 172f.

A second insulating layer 173f is disposed on the color filter layer 172f, and the description of the second insulating layer 173 of FIGS. 1 through 4 may be directly applicable to the second insulating layer 173f.

The contact hole 174f may be formed in the passivation layer 171f, the color filter layer 172f, and the second insulating layer 173f. The description of the second contact hole 174_2 of FIGS. 1 through 4 may be directly applicable to the contact hole 174f.

The pixel electrode 180f and a shielding electrode 189f are disposed on the second insulating layer 173f. The pixel electrode 180f and the shielding electrode 189f may be disposed on the same plane to not overlap each other.

The pixel electrode 180f may be physically connected to the drain electrode 166f via the contact hole 174f, and may receive the data voltage from the drain electrode 166f.

The pixel electrode 180f may be formed of a transparent conductive material such as ITO, IZO, ITZO, or AZO.

The active region 11f, which is a region where the pixel electrode 180f is disposed and actually transmits light therethrough, may be divided into four sub-regions. The four sub-regions may correspond to the four quadrants, respectively, of the active region 11f, and the upper right, upper left, lower left and lower right quadrants of the active region 11*f* may be defined as first, second, third and fourth domains DM1*f*, DM2*f*, DM3*f* and DM4*f*, respectively.

The first, second, third and fourth domains DM1*f*, DM2*f*, DM3*f* and DM4*f* may all have the same area and the same shape, although alternate embodiments are contemplated in which each domain has an arbitrary area and/or shape.

The pixel electrode 180*f* may include pixel slits 185*f*, which are openings where the transparent conductive material of the pixel electrode 180*f* is not provided. Due to the presence of the pixel slits 185*f*, patterns may be formed on the pixel electrode 180*f*, and the directions in which, and the degree to which, nearby liquid crystal molecules 210 are tilted may be controlled by the shape and the patterns of the pixel electrode 180*f*.

The pixel electrode 180*f* includes a stem electrode 181*f*, a plurality of branch electrodes 182*f*, the edge electrodes 186*f*, and an extension electrode 183*f*. The pixel electrode 180*f*, unlike the first sub-pixel electrode 180_1 of FIGS. 1 through 4, further includes the edge electrodes 186*f*. Also, the pixel electrode 180*f*, unlike the first sub-pixel electrode 180_1 of FIGS. 1 through 4, does not include the second sub-pixel electrode 180_2 of FIGS. 1 through 4.

That is, the description of the first stem electrode 181_1 of FIGS. 1 through 4 may be directly applicable to the stem electrode 181*f*, and the description of the first branch electrodes 182_1 of FIGS. 1 through 4 may be directly applicable to the branch electrodes 182*f*.

The edge electrodes 186*f* extend in a first or second direction D1 or D2 along the edges of the active region 11*f*. The edge electrodes 186*f* may extend from the ends of the stem electrodes 181*f*.

The extension electrode 183*f* is disposed to overlap the contact hole 174*f*. The extension electrode 183*f* may be disposed to cover the inner sidewalls of the contact hole 174*f*. As mentioned above, the extension electrode 183*f* may be physically connected to the drain electrode 166*f* via the contact hole 174*f* and may thus receive the data voltage. The extension electrode 183*f* may be disposed outside the active region 11*f*. The description of the first extension electrode 183_1 of FIGS. 1 through 4 may be directly applicable to the extension electrode 183*f*. More specifically, the extension electrode 183*f* includes first and second extensions 183_01*f* and 183_02*f*, and the descriptions of the first and second extensions 183_11 and 183_12 may be directly applicable to the first and second extensions 183_01*f* and 183_02*f*. The second extension 183_02*f* includes an extension slit 184*f*, and the description of the first extension slit 184_1 of FIGS. 1 through 4 may be directly applicable to the extension slit 184*f*.

The shielding electrode 189*f* may be disposed on the same layer as the pixel electrode 180*f*, and the description of the shielding electrode 189 of FIGS. 1 through 4 may be directly applicable to the shielding electrode 189*f*.

The second display substrate 300*f* may include a second base substrate 310*f*, a light-shielding member 320*f*, an overcoat layer 330*f* and a common electrode 340*f*. The description of the second base substrate 310 of FIGS. 1 through 4 may be directly applicable to the second base substrate 310*f*. The description of the light-shielding member 320 of FIGS. 1 through 4 may be directly applicable to the light-shielding member 320*f*. The description of the overcoat layer 330 of FIGS. 1 through 4 may be directly applicable to the overcoat layer 330*f*. The description of the common electrode 340 of FIGS. 1 through 4 may be directly applicable to the common electrode 340*f*.

The liquid crystal layer 200*f* is disposed between the first and second display substrates 100*f* and 300*f*, and the description of the liquid crystal layer 200 of FIGS. 1 through 4 may be directly applicable to the liquid crystal layer 200*f*.

In short, even though the pixel electrode 180*f* is integrally formed without being divided into two sub-pixel electrodes for displaying different voltages, improved controlling and restoring forces for the liquid crystal molecules 210 may be provided due to the structure of the extension electrode 183*f*.

Figure 14:
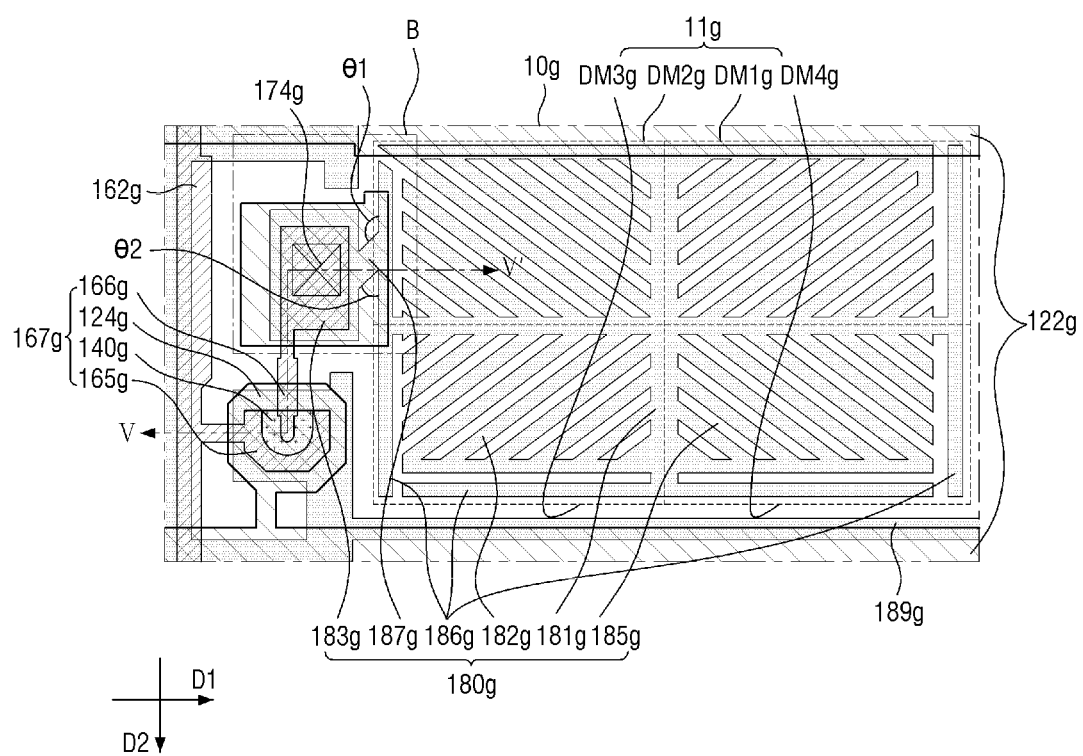
FIG. 14 is a layout view of a pixel of an LCD device according to another exemplary embodiment of the present disclosure.
Figure 15:
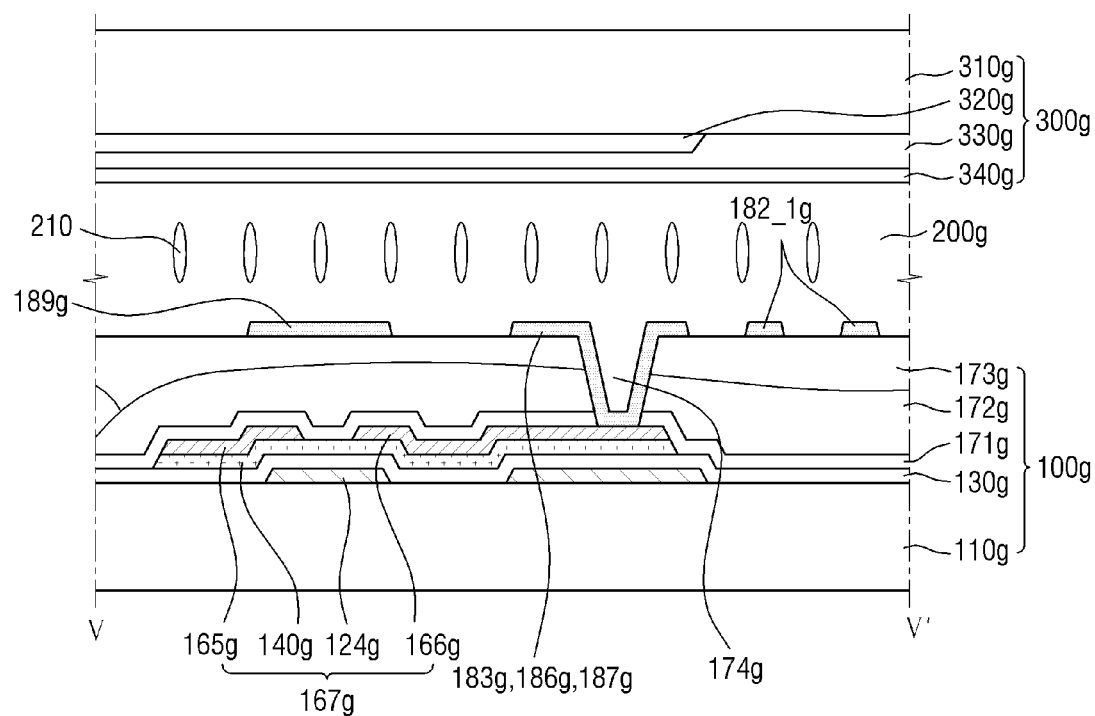
FIG. 15 is a cross-sectional view taken along line V-V' of FIG. 14.

FIG. 14 is a layout view of a pixel of an LCD device according to another exemplary embodiment of the present disclosure, and FIG. 15 is a cross-sectional view taken along line V-V' of FIG. 14.

A pixel 10*g* of the LCD device according to the present exemplary embodiment differs from the pixel 10 of the LCD device according to the exemplary embodiment of FIG. 1 in that a pixel electrode 180*g* is not divided into a plurality of sub-pixel electrodes, such as the first and second sub-pixel electrodes 180_1 and 180_2 of FIG. 1, and an active region 11*g* is not divided into a plurality of sub-active regions, such as the first and second sub-active regions 11_1 and 11_2 of FIG. 2. The pixel 10*g* of the LCD device according to the present exemplary embodiment not only includes the equivalents of the first stem electrode 180_1, the branch electrodes 182_1 and the first extension electrode 183_1 of FIG. 1, but also includes edge electrodes 186*g* and a connecting electrode 187*g*. Also, in the present exemplary embodiment, the long axis of the pixel 10*g* extends in a first direction D1, whereas in the exemplary embodiment of FIG. 1, the long axis of the pixel 10 extends in a second direction D2. The LCD device according to the present exemplary embodiment will hereinafter be described, focusing mainly on differences with the LCD device according to the exemplary embodiment of FIG. 1.

Referring to FIGS. 14 and 15, the LCD device according to the present exemplary embodiment includes a first display substrate 100*g*, a second display substrate 300*g* and a liquid crystal layer 200*g*.

A switching device for driving liquid crystal molecules 210 in the liquid crystal layer 200*g*, for example a TFT 167*g*, is provided in the first display substrate 100*g*. In the present exemplary embodiment, only one TFT 167*g* is provided, whereas in the exemplary embodiment of FIGS. 1 through 4, three TFTs, i.e., the first, second and third TFTs 167_1, 167_2 and 167_3, are provided. The second display substrate 300*g* is a counter substrate disposed to face the first display substrate 100*g*.

The LCD device according to the present exemplary embodiment includes multiple pixels 10*g* which are arranged in a matrix, and the description of the pixel 10 of FIGS. 1 through 4 may be directly applicable to the pixel 10*g*.

The first display substrate 100*g* will hereinafter be described.

A gate line 122*g* and a gate electrode 124*g* are provided on the first display substrate 100*g*. The descriptions of the gate line 122 and the second gate electrode 124_2 of FIGS. 1 through 4 may be directly applicable to the gate line 122*g* and the gate electrode 124*g*.

A first insulating layer 130*g* is disposed on the gate line 122*g* and the gate electrode 124*g*, and the description of the first insulating layer 130 of FIGS. 1 through 4 may be directly applicable to the first insulating layer 130*g*.

A semiconductor layer 140*g* is disposed on the first insulating layer 130*g*, and the description of the semiconductor layer 140 of FIGS. 1 through 4 may be directly applicable to the semiconductor layer 140*g*.

A data line 162*g*, a source electrode 165*g* and a drain electrode 166*g* are disposed on the semiconductor layer 140g and the first insulating layer 130g. The description of the data line 162 of FIGS. 1 through 4 may be directly applicable to the data line 162g. The description of the second source electrode 165_2 of FIGS. 1 through 4 may be directly applicable to the source electrode 165g. The description of the second drain electrode 166_2 of FIGS. 1 through 4 may be directly applicable to the drain electrode 166g.

The gate electrode 124g, the semiconductor layer 140g, the source electrode 165g and the drain electrode 166g may collectively form the TFT 167g, which is a switching device. In the present exemplary embodiment, unlike in the exemplary embodiment of FIGS. 1 through 4, only one switching device may be provided in the pixel 10g. Accordingly, in a case in which a gate voltage provided to the gate electrode 124g has a level turning on the TFT 167g, a data voltage provided to the data line 162g may be transmitted to the drain electrode 166g via the source electrode 165g.

A passivation layer 171g is disposed on the first insulating layer 130g and the TFT 167g, and the description of the passivation layer 171 of FIGS. 1 through 4 may be directly applicable to the passivation layer 171g.

A color filter layer 172g is disposed on the passivation layer 171g, and the description of the color filter layer 172 of FIGS. 1 through 4 may be directly applicable to the color filter layer 172g.

A second insulating layer 173g is disposed on the color filter layer 172g, and the description of the second insulating layer 173 of FIGS. 1 through 4 may be directly applicable to the second insulating layer 173g.

The contact hole 174g may be formed in the passivation layer 171g, the color filter layer 172g, and the second insulating layer 173g, and the description of the second contact hole 174_2 of FIGS. 1 through 4 may be directly applicable to the contact hole 174g.

The pixel electrode 180g and a shielding electrode 189g are disposed on the second insulating layer 173g. The pixel electrode 180g and the shielding electrode 189g may be disposed on the same plane to not overlap each other.

The pixel electrode 180g may be physically connected to the drain electrode 166g via the contact hole 174g, and may thus receive the data voltage.

The pixel electrode 180g may be formed of a transparent conductive material such as ITO, IZO, ITZO, or AZO.

The pixel electrode 180g may generally be disposed inside the active region 11g and may include a portion located outside the active region 11g for connection to the drain electrode 166g. For example, the pixel electrode 180g may include an extension electrode 183g that will be described later.

The active region 11g, which is a region where the pixel electrode 180g is disposed and actually transmits light therethrough, may be divided into four sub-regions. The four sub-regions may correspond to the four quadrants, respectively, of the active region 11g, and the upper right, upper left, lower left and lower right quadrants of the active region 11g may be defined as first, second, third and fourth domains DM1g, DM2g, DM3g and DM4g, respectively.

The first, second, third and fourth domains DM1g, DM2g, DM3g and DM4g may, though not necessarily, all have the same area and the same shape.

The pixel electrode 180g may include pixel slits 185g, which are openings where the transparent conductive material of the pixel electrode 180g is not provided. Due to the presence of the pixel slits 185g, patterns may be formed on the pixel electrode 180g, and the directions in which, and the degree to which, overlapping liquid crystal molecules 210 are tilted may be controlled by the shape and the patterns of the pixel electrode 180g.

The pixel electrode 180g includes a stem electrode 181g, a plurality of branch electrodes 182g, the edge electrodes 186g, the extension electrode 183g and the connecting electrode 187g.

The pixel electrode 180g, unlike the first sub-pixel electrode 180_1 of FIGS. 1 through 4, further includes the edge electrodes 186g and the connecting electrode 187g.

The stem electrode 181g may extend in first and second directions D1 and D2 and may be disposed across the active region 11g. The stem electrode 181g may be formed in a cross shape (+) between boundaries of neighboring ones of the first, second, third and fourth domain regions DM1g, DM2g, DM3g and DM4g. The description of the first stem electrode 181_1 of FIGS. 1 through 4 may be directly applicable to the stem electrode 181g.

The branch electrodes 182g may extend from the stem electrode 181g along a direction not parallel to the first or second direction D1 or D2. The description of the first branch electrodes 182_1 of FIGS. 1 through 4 may be directly applicable to the branch electrodes 182g.

The edge electrodes 186g extend in the first or second direction D1 or D2 along the edges of the active region 11g. The edge electrodes 186g may extend from the ends of the stem electrode 181g. More specifically, three edge electrodes 186g may be provided on the left side, the lower side, and the right side, respectively, of the active region 11g, but the present disclosure is not limited thereto. That is, an edge electrode 186g may also be provided on the upper side of the active region 11g. Due to the arrangement of the edge electrodes 186g, a controlling force for liquid crystal molecules 210 in a region along the sides of the active region 11g may be improved, and as a result, the display quality of the LCD device according to the present exemplary embodiment may be improved.

The extension electrode 183g is disposed to overlap the contact hole 174g. The extension electrode 183g may be disposed to cover the inner sidewalls of the contact hole 174g. As mentioned above, the extension electrode 183g may be physically connected to the drain electrode 166g via the contact hole 174g and may thus receive the data voltage. The extension electrode 183g may be disposed outside the active region 11g.

The connecting electrode 187g is disposed to extend from the inside to the outside of the active region 11g, and physically connects some of the edge electrodes 186g and the extension electrode 183g.

The width of the connecting electrode 187g may be smaller than the width of the extension electrode 183g. More specifically, the width of the connecting electrode 187g, measured in a direction perpendicular to the direction in which the connecting electrode 187g extends, may be smaller than the minimum width of the extension electrode 183g.

The connecting electrode 187g may extend in a direction not parallel to the first and second directions D1 and D2. That is, the connecting electrode 187g may extend in a third direction that intersects both the first and second directions D1 and D2. More specifically, the connecting electrode 187g may extend diagonally with respect to the first and second directions D1 and D2.

The connecting electrode 187g may be connected to one of the edge electrodes 186g to form a first angle θ1, which is an obtuse angle, and a second angle θ2, which is an acute angle, with respect to a corresponding edge electrode 186g.

A part of the connecting electrode 187g that forms the first angle θ1 with respect to the edge electrode 186g may be disposed closer to an end of edge electrode 186g than a part of the connecting electrode 187g that forms the second angle θ2. On the other hand, the part of the connecting electrode 187g that forms the second angle θ2 with respect to the edge electrode 186g may be disposed closer to stem electrode 181g than the part of the connecting electrode 187g that forms the first angle θ1.

Since the edge electrode 186g to which the connecting electrode 187g is connected extends in a straight line in one direction, the first and second angles 81 and 82 may be opposite to each other, and the sum of the first and second angles 81 and 82 may be 180 degrees.

By limiting the direction in which the connecting electrode 187g extends, controlling and restoring forces for liquid crystal molecules 210 in a region where the connecting electrode 187g is disposed may be improved, and this will be described later in detail with reference to FIGS. 16 and 17.

In a case in which the first angle θ1 is in the range of 130 degrees to 140 degrees and the second angle θ2 is in the range of 40 degrees to 50 degrees, a desirable amount of improvement in controlling and restoring forces for the liquid crystal molecules 210 may be achieved.

If the intersection between the connecting electrode 187g and the edge electrode 186g to which the connecting electrode 187g is connected lies on an extension of the stem electrode 181g, the liquid crystal molecules 210 may be tilted toward the outside of the active region 11g along the connecting electrode 187, rather than toward the center of the active region 11g. In this case, controlling and restoring forces for the liquid crystal molecules 210 may not be improved intended desired degree. Thus, the intersection between the connecting electrode 187g and the edge electrode 186g may be disposed to not fall on the extension of the stem electrode 181g.

The shielding electrode 189g may be disposed on the same layer as the pixel electrode 180g, and the description of the shielding electrode 189 of FIGS. 1 through 4 may be directly applicable to the shielding electrode 189g.

The second display substrate 300g may include a second base substrate 310g, a light-shielding member 320g, an overcoat layer 330g and a common electrode 340g. The description of the second base substrate 310 of FIGS. 1 through 4 may be directly applicable to the second base substrate 310g. The description of the light-shielding member 320 of FIGS. 1 through 4 may be directly applicable to the light-shielding member 320g. The description of the overcoat layer 330 of FIGS. 1 through 4 may be directly applicable to the overcoat layer 330g. The description of the common electrode 340 of FIGS. 1 through 4 may be directly applicable to the common electrode 340g.

The liquid crystal layer 200g is disposed between the first and second display substrates 100g and 300g, and the description of the liquid crystal layer 200 of FIGS. 1 through 4 may be directly applicable to the liquid crystal layer 200g.

The improvement of controlling and restoring forces for the liquid crystal molecules 210 will hereinafter be described with reference to FIGS. 14 and 15.

Figure 16:
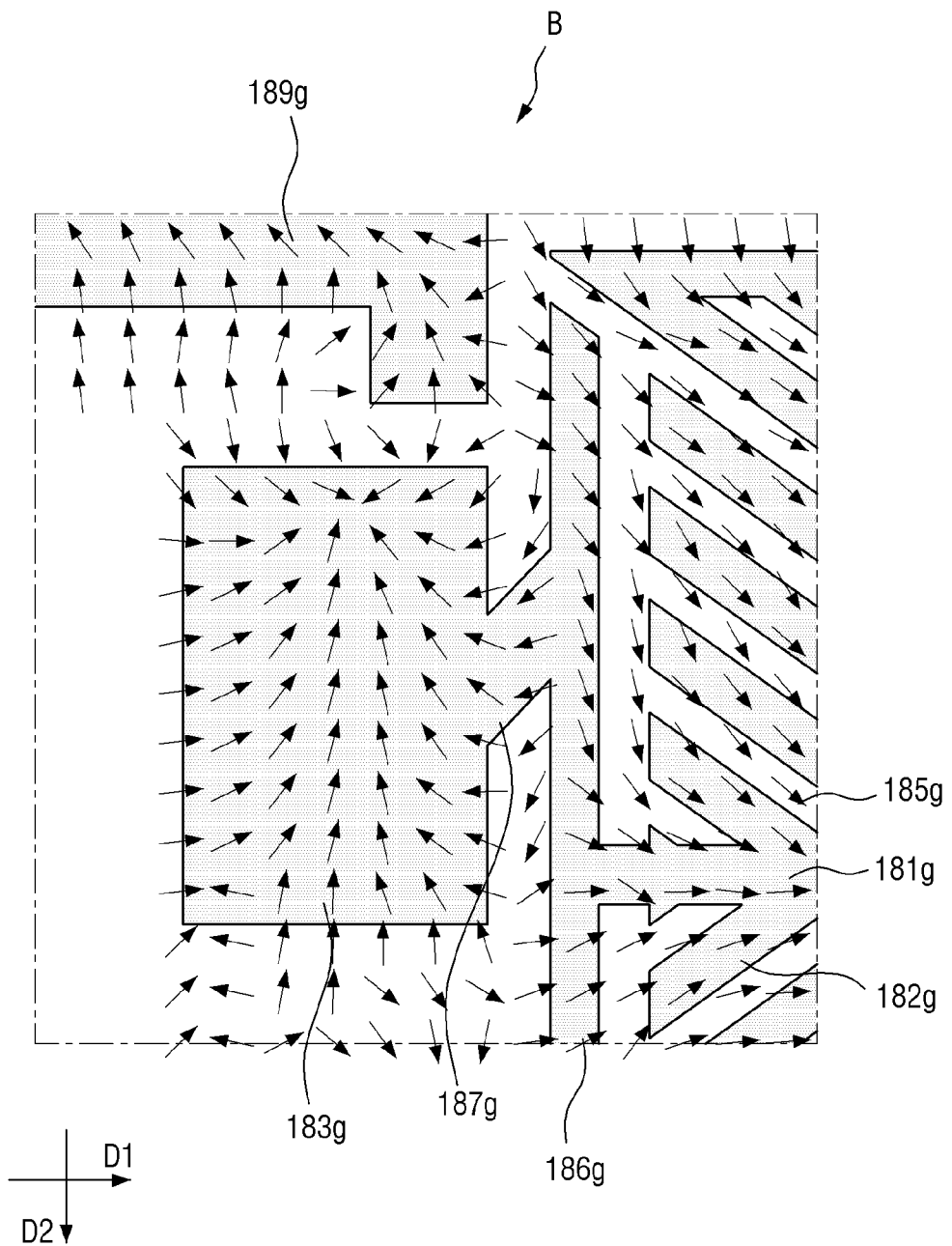
FIG. 16 is a layout view illustrating a pixel electrode and a shield electrode in an area B of FIG. 14.
Figure 17:
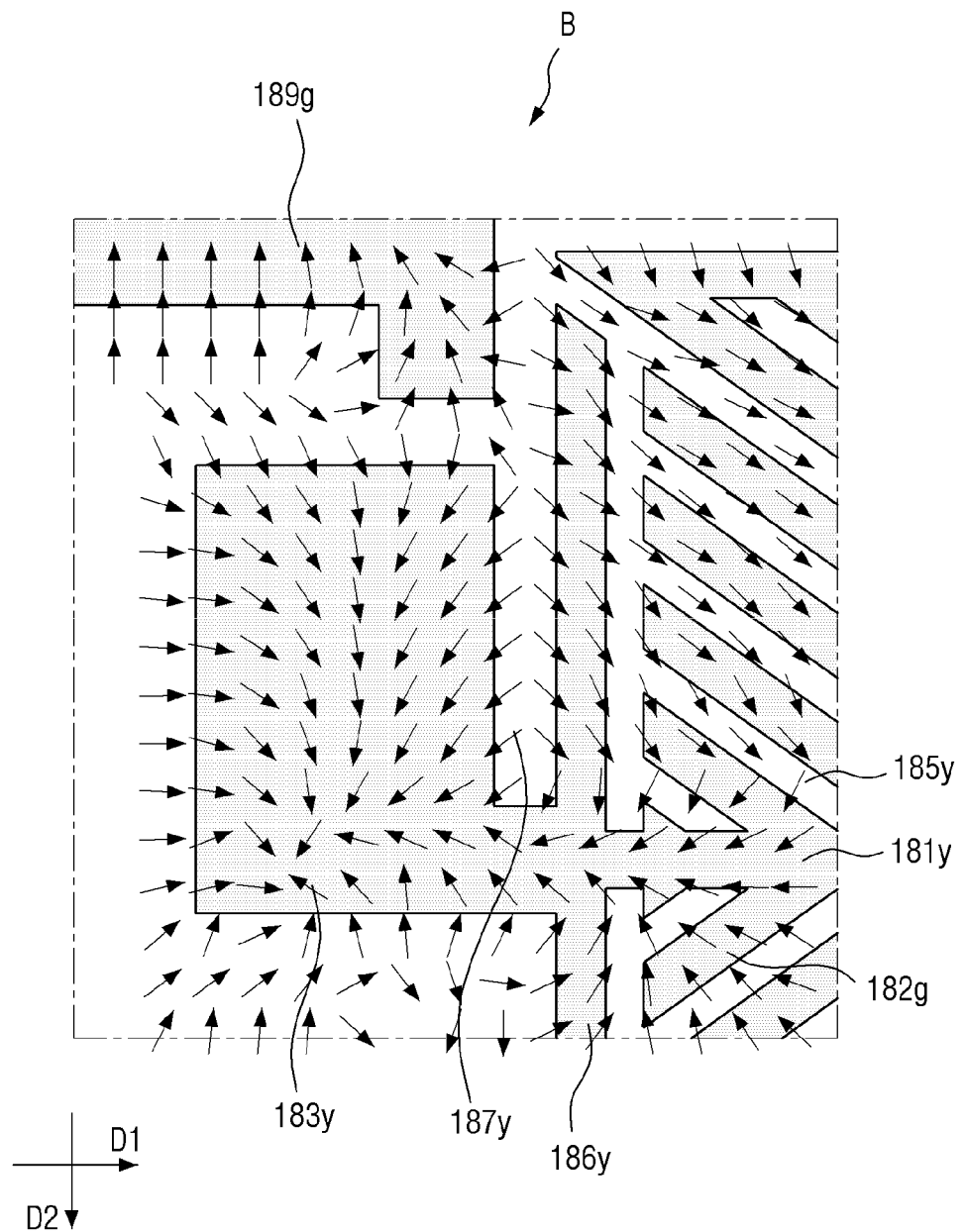
FIG. 17 is a layout view illustrating a pixel electrode and a shielding electrode for comparison with the pixel electrode and the shield electrode of FIG. 16.

FIG. 16 is a layout view illustrating a pixel electrode and a shield electrode in an area B of FIG. 14, and FIG. 17 is a layout view illustrating a pixel electrode and a shielding electrode for comparison with the pixel electrode and the shield electrode of FIG. 16.

For convenience, only the layer including the first sub-pixel electrode 180g and the shielding electrode 189g of FIG. 14 is illustrated in FIGS. 16 and 17. Referring to FIGS. 16 and 17, arrows indicate directions in which the liquid crystal molecules 210 are tilted in response to an electric field being applied by the pixel electrode 180g.

Referring to FIG. 16, the connecting electrode 187g of the pixel electrode 180g extends diagonally with respect to the first and second directions D1 and D2. In contrast, referring to FIG. 17, a connecting electrode 187y of a pixel electrode 180y extends in the first direction D1.

Referring to FIG. 16, liquid crystal molecules 210 laid over an edge electrode 186g are controlled to be tilted in a direction from the end to the center of the edge electrode 186g, i.e., a downward direction, due to the edge electrode 186g. Since the first angle θ1, which is an obtuse angle, is provided near the end of the edge electrode 186g, liquid crystal molecules 210 laid over the connecting electrode 187g may be controlled to be tilted in a lower left direction to be in parallel to the direction in which the connecting electrode 187g extends. As a result, even though there clearly exists a controlling force for tilting the liquid crystal molecules 210 in a rightward direction due to the presence of the extension electrode 183g and height differences formed by the contact hole 174g of FIG. 14 (which is disposed to overlap the extension electrode 183g), the liquid crystal molecules 210 disposed along the edge electrode 186g may generally be controlled to be tilted in the downward direction because the direction in which the liquid crystal molecules 210 are controlled by the connecting electrode 187g does not much differ from the direction in which the liquid crystal molecules 210 are controlled by the edge electrode 186g.

Also, since the intersection between the connecting electrode 187g and the edge electrode 186g is not in alignment with the stem electrode 181g, liquid crystal molecules 210 in a region where the edge electrode 186g and the stem electrode 181g are connected may be controlled to be tilted in the rightward direction, which is a direction toward the center of the active region 11g. Accordingly, controlling and restoring forces for the liquid crystal molecules 210 may be improved.

Referring to FIG. 17, an edge electrode 186y extends in a second direction D2, and liquid crystal molecules 210 laid over the edge electrode 186y may be controlled to be tilted in a downward direction. On the other hand, liquid crystal molecules 210 laid over the connecting electrode 187y may be controlled to be tilted in a leftward direction. However, since the leftward direction is a direction away from the center of the active region 11g of FIG. 14, controlling and restoring forces for the liquid crystal molecules 210 may weaken.

In short, due to the structural limit of the connecting electrode 187g of FIG. 14, any irregularities in the control of the liquid crystal molecules 210 may be reduced, and as a result, controlling and restoring forces for the liquid crystal molecules 210 may be improved.

FIGS. 16 and 17 illustrate exemplary directions in which the liquid crystal molecules 210 are tilted in response to a data voltage having a particular level being provided to the pixel electrode 180g of FIG. 14, but the actual tilt directions of the liquid crystal molecules 210 are not particularly limited to those illustrated in FIG. 16 or 17. That is, as the level of the data voltage provided to the pixel electrode 180g changes, the degree to which, and the directions in which, the liquid crystal molecules 210 are tilted may change accordingly. Also, the arrangement of the liquid crystal molecules 210 may differ from one pixel 10g to another pixel 10g regardless of whether the same data voltage is provided to each and every pixel 10g. The exact same arrangement of the liquid crystal molecules 210 as that illustrated in FIG. 16 or 17 may not be able to be obtained even when the same data voltage level is provided to the pixel electrode 180g again. That is, the pattern of the arrangement of the liquid crystal molecules 210 of FIG. 16 or 17 is merely exemplary for the purpose of describing the benefits of the present exemplary embodiment, such as improving controlling and restoring forces for the liquid crystal molecules 210, and the actual pattern of the arrangement of the liquid crystal molecules 210 may differ from that illustrated in FIG. 16 or 17. However, the general pattern of the arrangement of the liquid crystal molecules 210 is as described above with reference to FIGS. 16 and 17, and thus the benefits of the present exemplary embodiment are apparent from the above description with reference to FIGS. 16 and 17.

Figure 18:
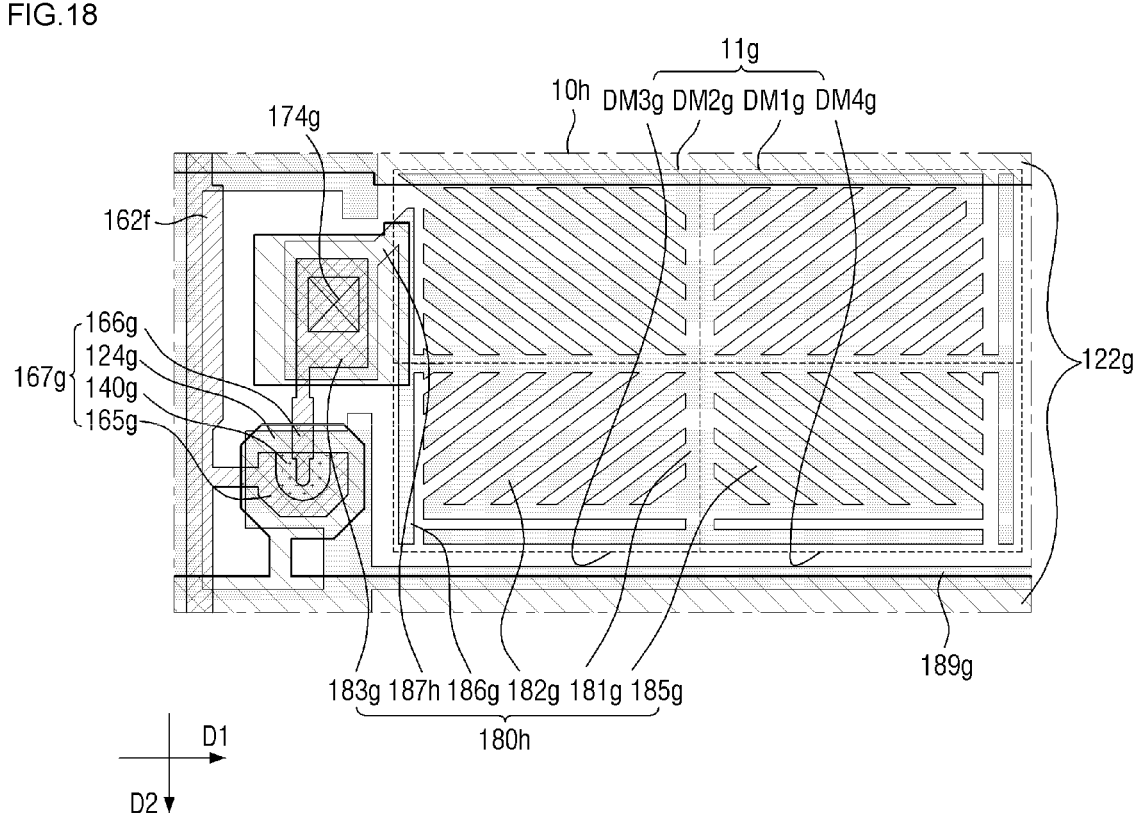
FIG. 18 is a layout view of a pixel of an LCD device according to another exemplary embodiment of the present disclosure.

FIG. 18 is a layout view of a pixel of an LCD device according to another exemplary embodiment of the present disclosure.

A pixel 10h of the LCD device according to the present exemplary embodiment differs from the pixel 10g of the LCD device according to the exemplary embodiment of FIG. 14 in terms of a location at which a connecting electrode 187h and an edge electrode 186g are connected. The LCD device according to the present exemplary embodiment will hereinafter be described, focusing mainly on differences with the LCD device according to the exemplary embodiment of FIG. 14.

Referring to FIG. 18, the connecting electrode 187h is directly connected to the end of an edge electrode 186g. That is, the connecting electrode 187h extends from an extension electrode 183g toward the end of the edge electrode 186g. Accordingly, the first angle θ1 of FIG. 14 may not be formed at the intersection between the connecting electrode 187h and the edge electrode 186g. In this case, liquid crystal molecules 210 laid over the connecting electrode 187h may be controlled to be tilted in a lower left direction, and liquid crystal molecules 210 laid over the edge electrode 186h may be controlled to be tilted in a downward direction. Since the direction in which the liquid crystal molecules 210 laid over the connecting electrode 187h are controlled, and the direction in which the liquid crystal molecules 210 laid over the edge electrode 186h are controlled, do not much differ from each other, controlling and restoring forces for the liquid crystal molecules 210 may be improved.

Figure 19:
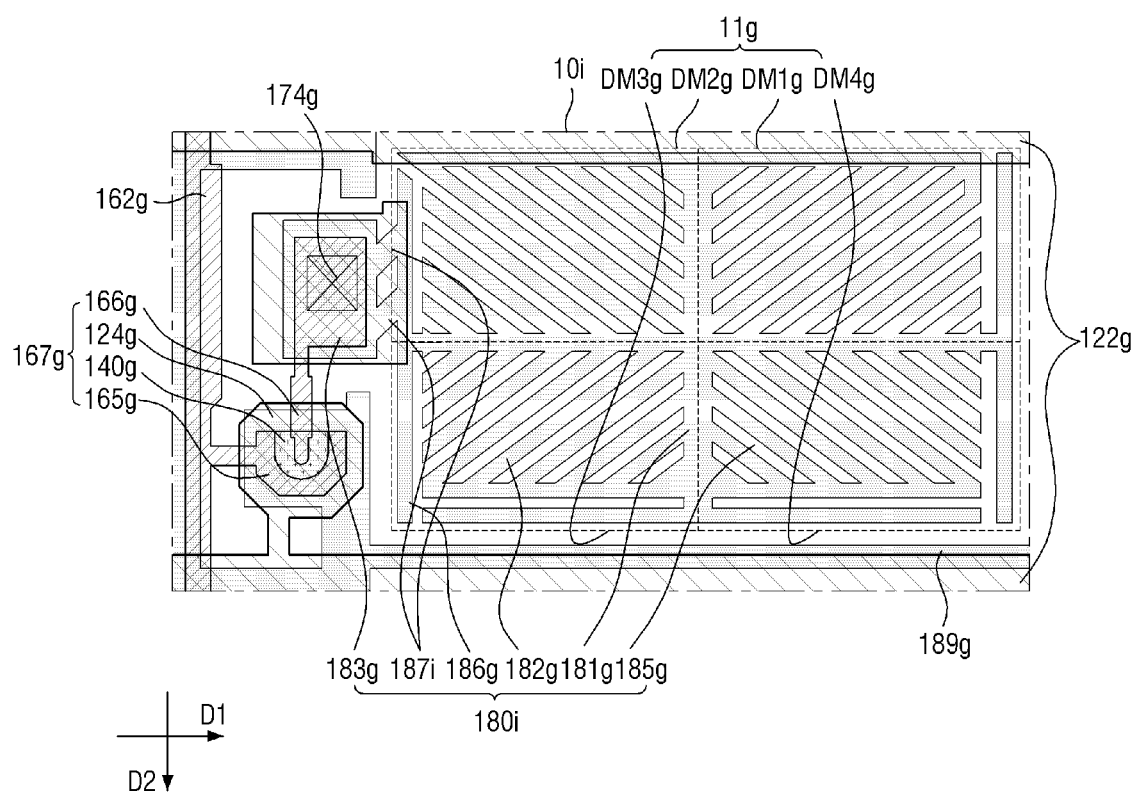
FIG. 19 is a layout view of a pixel of an LCD device according to another exemplary embodiment of the present disclosure.

FIG. 19 is a layout view of a pixel of an LCD device according to another exemplary embodiment of the present disclosure.

A pixel 10i of the LCD device according to the present exemplary embodiment differs from the pixel 10g of the LCD device according to the exemplary embodiment of FIG. 14 in terms of the number of connecting electrodes 187i. The LCD device according to the present exemplary embodiment will hereinafter be described, focusing mainly on differences with the LCD device according to the exemplary embodiment of FIG. 14.

Referring to FIG. 19, a plurality of connecting electrodes 187i, for example two connecting electrodes 187i, are formed in the pixel 10i. Thus, even if one of the connecting electrodes 187i is disconnected due to a manufacturing defect, the pixel 10i may still be able to operate properly due to the other connecting electrode 187i. In addition, since the description of the connecting electrode 187g of FIG. 14 directly applies to the connecting electrodes 187i, the same benefits as those provided by the connecting electrode 187g of FIG. 14, such as improved controlling and restoring forces for liquid crystal molecules 210, may be provided.

Figure 20:
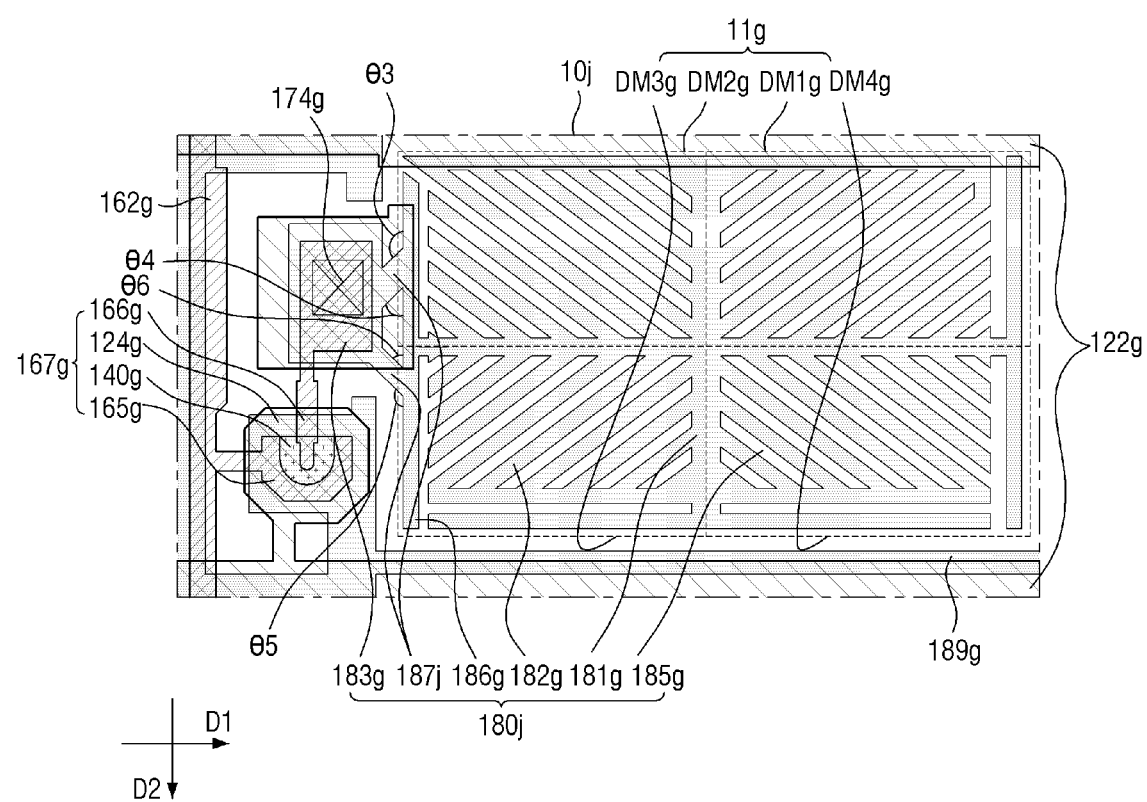
FIG. 20 is a layout view of a pixel of an LCD device according to another exemplary embodiment of the present disclosure.

FIG. 20 is a layout view of a pixel of an LCD device according to another exemplary embodiment of the present disclosure.

A pixel 10j of the LCD device according to the present exemplary embodiment differs from the pixel 10g of the LCD device according to the exemplary embodiment of FIG. 14 in terms of the number of connecting electrodes 187j. The LCD device according to the present exemplary embodiment will hereinafter be described, focusing mainly on differences with the LCD device according to the exemplary embodiment of FIG. 14.

Referring to FIG. 20, a plurality of connecting electrodes 187j are formed in the pixel 10j. In the perspective of FIG. 20, the intersection between an upper connecting electrode 187j and an edge electrode 186g may be disposed closer to an upper end of the edge electrode 186g. On the other hand, in the perspective of FIG. 20, the intersection between a lower connecting electrode 187j and the edge electrode 186g may be disposed closer to a lower end of the edge electrode 186g. That is, the ends of branch electrodes 182g disposed adjacent to one of the connecting electrodes 187j may differ in orientation from the ends of branch electrodes 182g disposed adjacent to the other connecting electrode 187j.

In this case, an obtuse angle between each connecting electrode 187j and the edge electrode 186g is provided close to both the upper and lower end of the edge electrode 186g, and thus, the direction in which one of the connecting electrodes 187j extends may differ from the direction in which the other connecting electrode 187j extends.

More specifically, in the perspective of FIG. 20, the upper connecting electrode 187j forms third and fourth angles 83 and 84 with respect to the edge electrode 186g, and the third angle θ3, which is disposed closer than the fourth angle θ4 to the upper end of the edge electrode 186g, is an obtuse angle. Accordingly, the upper connecting electrode 187j may extend in an upper right direction.

Also, in the perspective of FIG. 20, the lower connecting electrode 187j forms fifth and sixth angles 85 and 86 with respect to the edge electrode 186g, and the fifth angle θ5, which is disposed closer than the sixth angle θ6 to the lower end of the edge electrode 186g, is an obtuse angle. Accordingly, the lower connecting electrode 187j may extend in a lower right direction.

Each of the connecting electrodes 187j is thus of a shape and position for improving controlling and restoring forces for liquid crystal molecules 210. Thus, each of the connecting electrodes 187j may improve controlling and restoring forces for liquid crystal molecules 210.

In the exemplary embodiments of FIGS. 14 through 20, the long axes of the pixels 10g, 10h, 10i, and 10j all extend in the first direction D1, but the present disclosure is not limited thereto. That is, the same benefits as those provided by the exemplary embodiments of FIGS. 14 through 20, such as improved controlling and restoring forces for the liquid crystal molecules 210, can also be provided with a configuration in which the long axes of pixels extend in the second direction D2.

Also, in the exemplary embodiments of FIGS. 14 through 20, the pixel electrode 180g is not divided into a plurality of sub-pixel electrodes, and the same voltage is provided throughout the entire pixel electrode 180g. However, the present disclosure is not limited to the exemplary embodiments of FIGS. 14 through 20. That is, the same benefits as those provided by the exemplary embodiments of FIGS. 14 through 20, such as improved controlling and restoring forces for the liquid crystal molecules 210, can also be provided with a configuration in which the pixel electrode 180g is divided into a plurality of sub-pixel electrodes in which the applied voltage differs from one sub-pixel electrode to another sub-pixel electrode.

The effects of the present invention are not limited by the foregoing, and other various effects are anticipated herein.

In concluding the detailed description, those skilled in the art will appreciate that many variations and modifications can be made to the preferred embodiments without substantially departing from the principles of the present invention. Therefore, the disclosed preferred embodiments of the invention are used in a generic and descriptive sense only and not for purposes of limitation. Various features of the above described and other embodiments can be mixed and matched in any manner, to produce further embodiments consistent with the invention.

What is claimed is:

1. An LCD device, comprising:
a substrate;
a pixel electrode disposed on the substrate; and
a gate line extending in a first direction,
wherein the pixel electrode includes a stem electrode which extends in the first direction and a second direction that is perpendicular to the first direction, branch electrodes which extend from the stem electrode, a first edge electrode which extends from an end of the stem electrode and extends in the second direction along an outer boundary of the branch electrodes without contacting the branch electrodes, and a connecting electrode which connects to the first edge electrode.

2. The LCD device of claim 1, wherein
the first edge electrode is separated from the branch electrodes.

3. The LCD device of claim 2, further comprising:
a TFT disposed on the substrate;
an insulating layer disposed on the TFT; and
an extension electrode which is disposed to overlap a contact hole and connected to the connecting electrode,
wherein the pixel electrode disposed on the insulating layer and connected to a drain electrode of the TFT via a contact hole formed in the insulating layer, and
wherein the connecting electrode extends in a third direction which intersects both the first and second directions.

4. The LCD device of claim 1, wherein
the first edge electrode extends in one direction and is a straight line.

5. The LCD device of claim 1, wherein
a width of the first edge electrode is smaller than a width of the stem electrode.

6. The LCD device of claim 1, further comprising:
a second edge electrode extending in the first direction,
wherein the second edge electrode is separated from the first edge electrode.

7. The LCD device of claim 6, further comprising:
a third edge electrode extending in the second direction,
the second edge electrode is between the first edge electrode and the third edge electrode.

8. An LCD device, comprising:
a substrate; and
a pixel electrode,
wherein the pixel electrode includes a stem electrode which extends in a first direction and a second direction that is perpendicular to the first direction, branch electrodes which extend from the stem electrode, and a first edge electrode and a second edge electrode which extend from an end of the stem electrode in the first direction along an outer boundary of the branch electrodes but not beyond the outer boundary of the branch electrodes, and
the first edge electrode is connected to the branch electrodes and located between the branch electrodes and the second edge electrode.

9. The LCD device of claim 8, further comprising:
a TFT disposed on the substrate;
an insulating layer disposed on the TFT;
a third edge electrode extending in the second direction;
an extension electrode which is disposed to overlap a contact hole formed in the insulating layer; and
a connecting electrode which connects the extension electrode and the third edge electrode,
wherein the connecting electrode extends in a third direction which intersects both the first and second directions.

10. The LCD device of claim 9, wherein
the third edge electrode is separated from the branch electrodes.

11. The LCD device of claim 10, wherein
the third edge electrode is separated from the first edge electrode and the second edge electrode.

12. The LCD device of claim 8, wherein
the first edge electrode is connected to the second edge electrode.

13. The LCD device of claim 8, further comprising:
a gate line extending in the first direction.

14. The LCD device of claim 9, wherein
a width of the third edge electrode is smaller than a width of the stem electrode.

15. An LCD device, comprising:
a substrate; and
a pixel electrode,
wherein the pixel electrode includes,
a stem electrode which extends in a first direction and a second direction that is perpendicular to the first direction;
branch electrodes which extend from the stem electrode;
a first edge electrode which extends from an end of the stem electrode and extends in the first direction along an outer boundary of the branch electrodes; and
a second edge electrode and a third edge electrode which extend from an end of the stem electrode and extend in the second direction along an outer boundary of the branch electrodes,
wherein the first edge electrode is located between the second edge electrode and the third edge electrode and spaced apart from the second edge electrode.

16. The LCD device of claim 15, wherein
the first edge electrode is separated from the second edge electrode and the third edge electrode.

17. The LCD device of claim 15, further comprising:
a TFT disposed on the substrate;
an insulating layer disposed on the TFT;
an extension electrode which is disposed to overlap a contact hole formed in the insulating layer; and
a connecting electrode which connects the extension electrode and the second edge electrode,
wherein the connecting electrode extends in a third direction which intersects both the first and second directions.

18. The LCD device of claim 17, wherein
the second edge electrode is separated from the branch electrodes.

19. The LCD device of claim 16, wherein
a width of the second edge electrode is smaller than a width of the stem electrode.

20. The LCD device of claim 16, wherein
the second edge electrode extends in one direction and is a straight line.

21. An LCD device, comprising:
a substrate;
a pixel electrode disposed on the substrate; and
a gate line extending in a first direction,
wherein the pixel electrode includes:
   a stem electrode including a first portion extending in the first direction and a second portion extending in a second direction intersecting the first direction,
   a branch electrode extending from the first portion of the stem electrode in a third direction which is different from the first direction and the second direction,
   an edge electrode which extends from an end of the first portion of the stem electrode and extends in the second direction, and
   a connecting electrode which extends from a first edge of the edge electrode,
wherein an edge of the branch electrode faces a second edge of the edge electrode which is opposite to the first edge of the edge electrode, and
wherein the edge of the branch electrode and the second edge of the edge electrode are spaced apart from each other.

* * * * *